US012676143B2

(12) United States Patent
Xiao et al.

(10) Patent No.: US 12,676,143 B2
(45) Date of Patent: Jul. 7, 2026

(54) DECENTRALIZED LEARNING OF LARGE MACHINE LEARNING (ML) MODEL(S)

(71) Applicant: GOOGLE LLC, Mountain View, CA (US)

(72) Inventors: Yonghui Xiao, Sunnyvale, CA (US); Françoise Beaufays, Mountain View, CA (US); Yuxin Ding, San Francisco, CA (US)

(73) Assignee: Google LLC, Mountain View, CA (US)

( * ) Notice: Subject to any disclaimer, the term of this patent is extended or adjusted under 35 U.S.C. 154(b) by 162 days.

(21) Appl. No.: 18/794,773

(22) Filed: Aug. 5, 2024

(65) Prior Publication Data

US 2025/0078812 A1 Mar. 6, 2025

Related U.S. Application Data

(60) Provisional application No. 63/536,828, filed on Sep. 6, 2023.

(51) Int. Cl.
*G10L 15/06* (2013.01)
*G06N 3/098* (2023.01)
(Continued)

(52) U.S. Cl.
CPC ............ *G10L 15/063* (2013.01); *G06N 3/098* (2023.01); *G10L 15/183* (2013.01); *G10L 15/30* (2013.01); *G10L 2015/0635* (2013.01)

(58) Field of Classification Search
USPC ...................................................... 704/1–504
See application file for complete search history.

(56) References Cited

U.S. PATENT DOCUMENTS 12,175,338 B2 * 12/2024 Zhou ...................... G06N 3/098
12,488,798 B1 * 12/2025 Eakin ..................... G06N 3/045
(Continued)

FOREIGN PATENT DOCUMENTS

CN 108805795 A * 11/2018 ............. G06N 3/045
WO WO-2023101689 A1 * 6/2023 ........... G06F 18/217
WO WO-2025053933 A1 * 3/2025 ............. G10L 15/30

OTHER PUBLICATIONS

European Patent Office; Invitation to Pay Additional Fees issued in Application No. PCT/US2024041113; 21 pages; dated Dec. 12, 2024.

(Continued)

*Primary Examiner* — Marcus T Riley
(74) *Attorney, Agent, or Firm* — Gray Ice Higdon

(57) ABSTRACT

Implementations described herein are directed to a framework for decentralized learning of large global machine learning (ML) model(s). In various implementations, remote processor(s) of a remote system can identify a global ML model, select client devices to participate in a given round of decentralized learning of the global ML model, and transmit, to each of the client devices, a processed version of the global ML model that is of a reduced transferrable size. Further, client device processor(s) of a client device can receive the processed version of the global ML model, obtain corresponding client data, perform partial model training, based on processing the corresponding client data, for the processed version of the global ML model to generate a corresponding update, and transmit the corresponding update back to the remote system. Moreover, the remote processor(s) can update, based on at least the corresponding update, the global ML model.

20 Claims, 9 Drawing Sheets

(51) Int. Cl.
*G10L 15/183* (2013.01)
*G10L 15/30* (2013.01)

(56) References Cited

U.S. PATENT DOCUMENTS

| | | | | |
|---|---|---|---|---|
| 12,533,800 | B2 * | 1/2026 | Hafner | B25J 9/163 |
| 2021/0158162 | A1 * | 5/2021 | Hafner | B25J 9/163 |
| 2023/0177382 | A1 * | 6/2023 | Beaufays | H04L 67/10<br>706/12 |
| 2024/0276534 | A1 * | 8/2024 | Marzban | H04W 72/542 |
| 2025/0078812 | A1 * | 3/2025 | Xiao | G10L 15/063 |

OTHER PUBLICATIONS

European Patent Office; International Search Report and Written Opinion issued in Application No. PCT/US2024/041113; 24 pages; dated Feb. 3, 2025.

* cited by examiner

300

IDENTIFY A GLOBAL MACHINE LEARNING (ML) MODEL THAT IS ACCESSIBLE AT A REMOTE SYSTEM 352

SELECT A PLURALITY OF CLIENT DEVICES TO PARTICIPATE IN A GIVEN ROUND OF DECENTRALIZED LEARNING OF THE GLOBAL ML MODEL 354

TRANSMIT, TO A GIVEN CLIENT DEVICE, A CORRESPONDING REQUEST FOR WHETHER THE GIVEN CLIENT DEVICE HAS RECEIVED CORRESPONDING FEEDBACK WITH RESPECT TO PROCESSING CORRESPONDING CLIENT DEVICE DATA USING A CORRESPONDING ON-DEVICE ML MODEL THAT IS AN ON-DEVICE VERSION OF THE GLOBAL ML MODEL 354A

RECEIVE, FROM THE GIVEN CLIENT DEVICE, A CORRESPONDING RESPONSE THAT IS RESPONSIVE TO THE CORRESPONDING REQUEST 354B

TRANSMIT, TO EACH OF THE PLURALITY OF CLIENT DEVICES, A PROCESSED VERSION OF THE GLOBAL ML MODEL 356

TRANSMIT, TO EACH OF THE PLURALITY OF CLIENT DEVICES, AN INDICATION OF WEIGHTED CLIENT AGGREGATION (WCA) TECHNIQUE(S) 356A

RECEIVE, FROM EACH THE PLURALITY OF CLIENT DEVICES, A CORRESPONDING UPDATE FOR THE GLOBAL ML MODEL 358

EACH OF THE PLURALITY OF CLIENT DEVICES GENERATE THE CORRESPONDING UPDATES USING PARTIAL MODEL TRAINING AND THE WCA TECHNIQUE(S) 358A

UPDATE, BASED ON THE CORRESPONDING UPDATES FOR THE GLOBAL ML MODEL, THE GLOBAL MODEL 360

CONDITION(S) SATISFIED? 362

NO

YES

CAUSE THE GLOBAL ML MODEL TO BE DEPLOYED 364

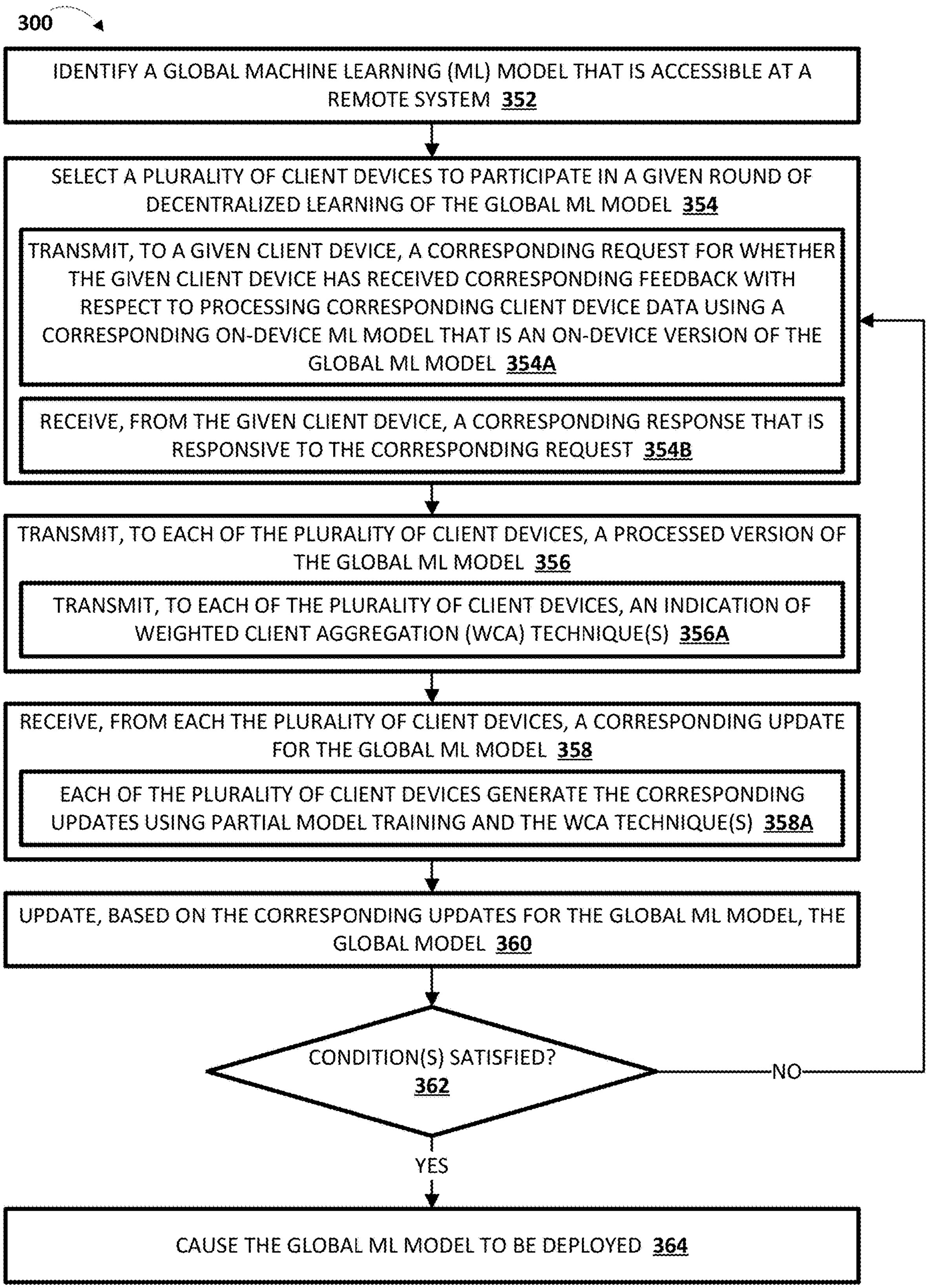

RECEIVE, FROM A REMOTE SYSTEM, A PROCESSED VERSION OF A GLOBAL MACHINE LEARNING (ML) MODEL 452

OBTAIN CORRESPONDING CLIENT DATA 454

OBTAIN, FROM A SUPERSET OF CORRESPONDING CLIENT DATA, THE CORRESPONDING CLIENT DATA THAT IS ASSOCIATED WITH CORRESPONDING FEEDBACK THAT INDICATES A CORRESPONDING USER OF A CLIENT DEVICE HAS CORRECTED PRIOR OUTPUT GENERATED USING A CORRESPONDING ON-DEVICE VERSION OF THE GLOBAL ML MODEL 454A

PROCESS, USING THE PROCESSED VERSION OF THE GLOBAL ML MODEL, AN INSTANCE OF THE CORRESPONDING CLIENT DATA TO GENERATE CORRESPONDING PREDICTED OUTPUT 456

DETERMINE, BASED ON THE CORRESPONDING PREDICTED OUTPUT AND CORRESPONDING FEEDBACK THAT WAS PREVIOUSLY RECEIVED WITH RESPECT TO PREVIOUS PROCESSING OF THE INSTANCE OF THE CORRESPONDING CLIENT DATA AND USING THE CORRESPONDING ON-DEVICE ML MODEL, A CORRESPONDING LOSS FOR THE PROCESSED VERSION OF THE GLOBAL ML MODEL 458

GENERATE, BASED ON THE CORRESPONDING LOSS FOR THE PROCESSED VERSION OF THE GLOBAL ML MODEL AND WHILE FREEZING PORTION(S) OF THE PROCESSED VERSION OF THE GLOBAL ML MODEL, A CORRESPONDING UPDATE FOR THE GLOBAL ML MODEL 460

GENERATE THE CORRESPONDING UPDATE FOR THE GLOBAL ML MODEL USING WEIGHTED CLIENT AGGREGATION (WCA) TECHNIQUES INDICATED BY THE REMOTE SYSTEM 460A

ADDITIONAL INSTANCE OF THE CORRESPONDING CLIENT DATA? 462

YES

NO

TRANSMIT, TO THE REMOTE SYSTEM, THE CORRESPONDING UPDATE FOR THE GLOBAL ML MODEL 464

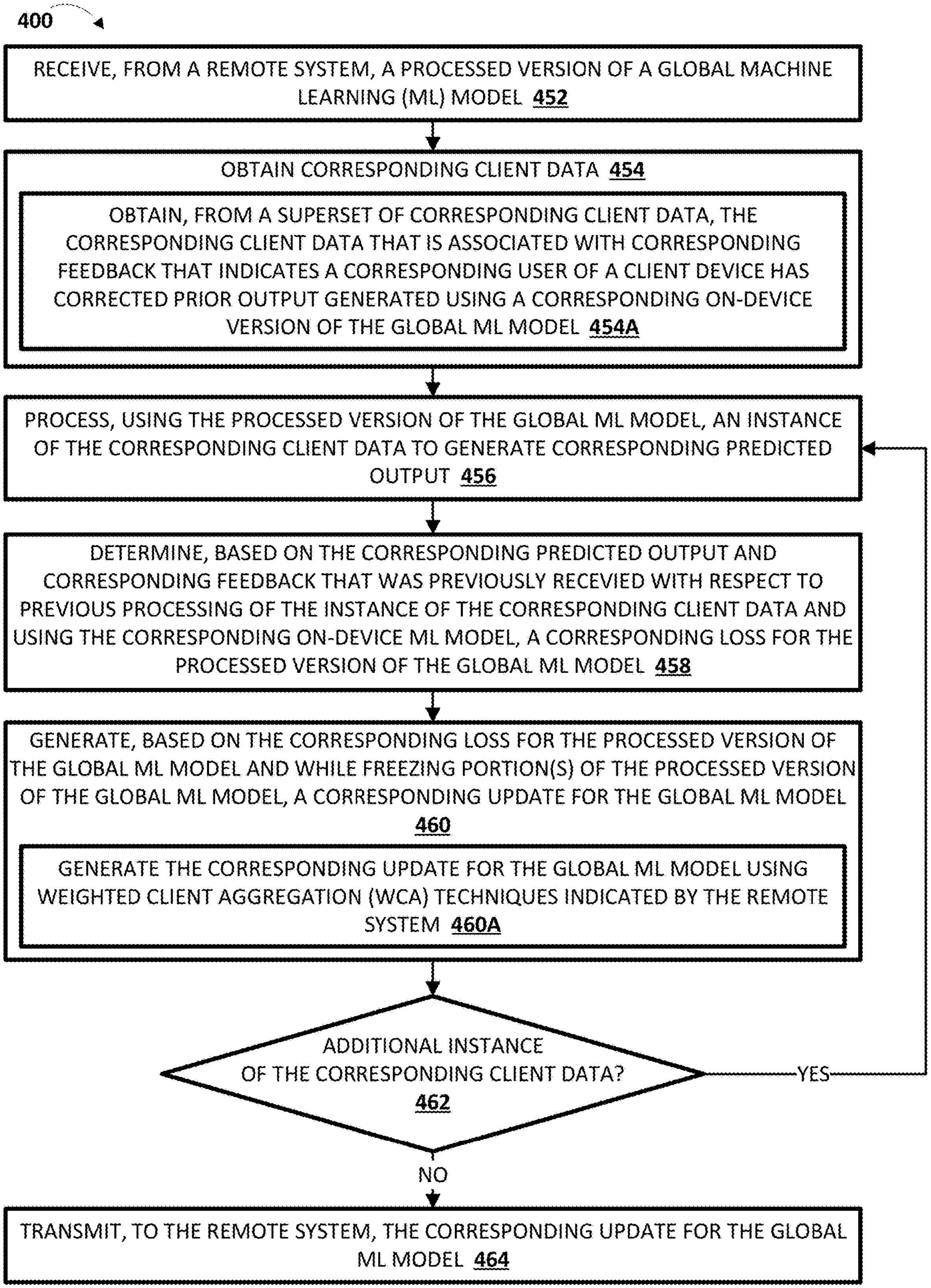

RECEIVE, FROM A REMOTE SYSTEM, A PROCESSED VERSION OF GLOBAL MACHINE LEARNING (ML) MODEL 552

OBTAIN CORRESPONDING CLIENT DATA 554

OBTAIN, FROM A SUPERSET OF CORRESPONDING CLIENT DATA, THE CORRESPONDING CLIENT DATA THAT IS ASSOCIATED WITH CORRESPONDING FEEDBACK THAT INDICATES A CORRESPONDING USER OF A CLIENT DEVICE HAS CORRECTED PRIOR OUTPUT GENERATED USING A CORRESPONDING ON-DEVICE VERSION OF THE GLOBAL ML MODEL 554A

PROCESS, USING THE PROCESSED VERSION OF THE GLOBAL ML MODEL, AN INSTANCE OF THE CORRESPONDING CLIENT DATA TO GENERATE CORRESPONDING PREDICTED OUTPUT 556

FINE-TUNE, BASED ON THE PREDICTED OUTPUT AND WHILE FREEZING PORTION(S) OF THE PROCESSED VERSION OF THE GLOBAL ML MODEL, THE PROCESSED VERSION OF THE GLOBAL ML MODEL TO GENERATE A CORRESPONDING FINE-TUNED PROCESSED VERSION OF THE GLOBAL ML MODEL 558

FINE-TUNE THE PROCESSED VERSION OF THE GLOBAL ML MODEL USING WEIGHTED CLIENT AGGREGATION (WCA) TECHNIQUES INDICATED BY THE REMOTE SYSTEM 558A

ADDITIONAL INSTANCE OF THE CORRESPONDING CLIENT DATA? 560

YES

NO

TRANSMIT, TO THE REMOTE SYSTEM, THE CORRESPONDING FINE-TUNED PROCESSED VERSION OF THE GLOBAL ML MODEL 562

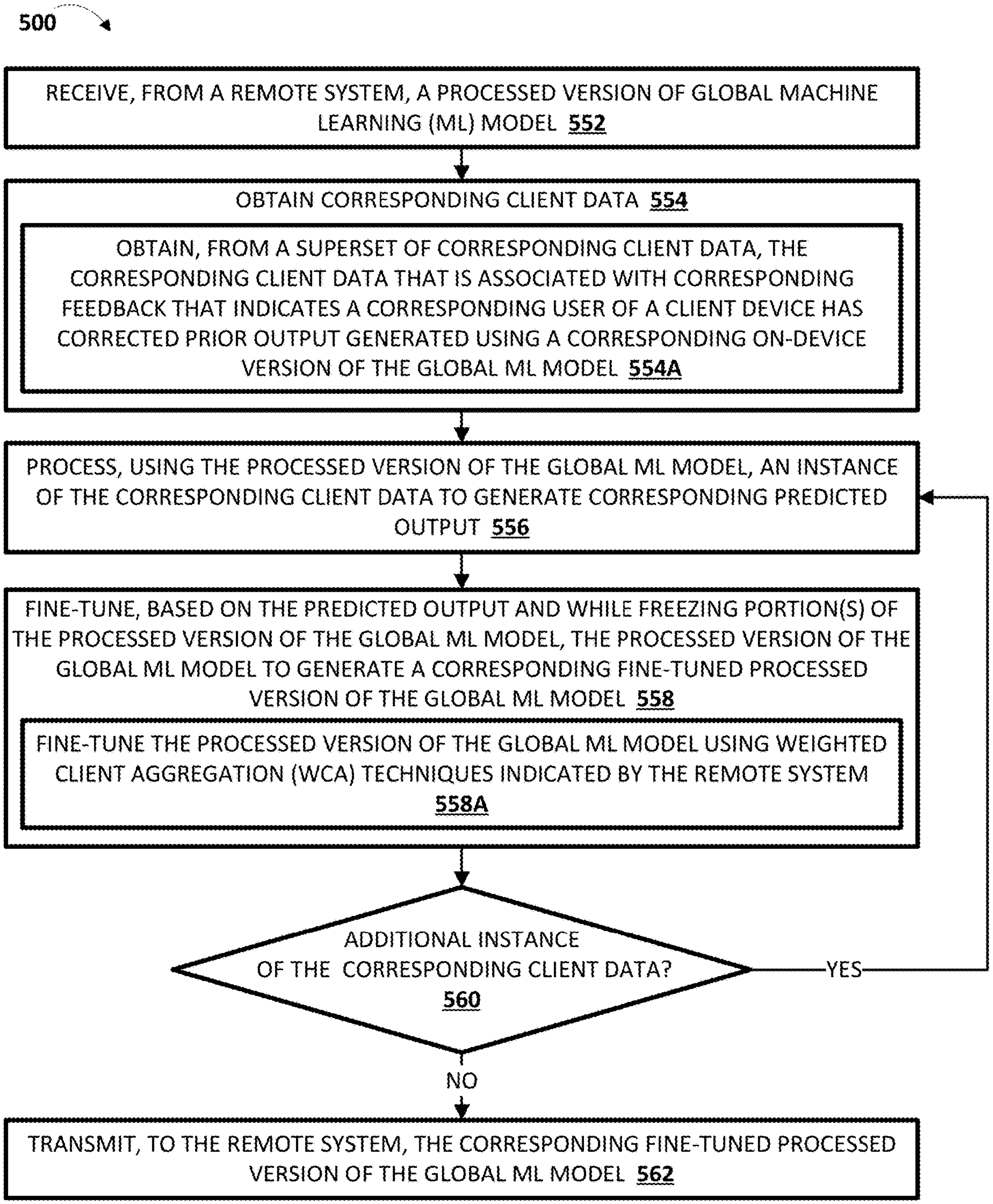

FIG. 5

DECENTRALIZED LEARNING OF LARGE MACHINE LEARNING (ML) MODEL(S)

BACKGROUND

Decentralized learning of machine learning (ML) model(s) is an increasingly popular ML technique for updating ML model(s) due to various privacy considerations. In one common implementation of decentralized learning, an on-device ML model is stored locally on a client device of a user, and a global ML model, that is a cloud-based counterpart of the on-device ML model, is stored remotely at a remote system (e.g., a server or cluster of servers). During a given round of decentralized learning, the client device can check-in to a population of client devices that will be utilized in the given round of decentralized learning, download a global ML model or weights thereof from the remote system (e.g., to be utilized as the on-device ML model), generate an update for the weight of the global ML model based on processing instance(s) of client data locally at the client device and using the on-device ML model, and upload the update for the weight of the global ML model back to the remote system and without transmitting the instance(s) of the client device. The remote system can utilize the update received from the client device, and additional updates generated in a similar manner at additional client devices and that are received from the additional client devices, to update the weights of the global ML model.

However, for a given round of decentralized learning for updating of the global ML model, the client device and the additional client devices have limited memory and are only afforded a certain duration of time to perform each of the aforementioned operations. For instance, the client device and each of the additional client devices may only have a gigabyte, or a few gigabytes, allocated for performance of each of the aforementioned operations. Also, for instance, the client device and each of the additional client devices may only be afforded 10 minutes, or some other relatively short duration of time, to perform each of the aforementioned operations.

In consequence, global ML models that are trained in a decentralized manner generally need to be less than a threshold size to enable the client device and the additional client devices to perform each of the aforementioned operations within the certain duration of time. Otherwise, the memory allocation may be insufficient for downloading the global ML model, or the weights thereof, for utilization as the on-device ML model. Further, and even if the memory allocation is sufficient for downloading the global ML model, or the weights thereof, the time consumed in downloading the global ML model, or the weights thereof, for utilization as the on-device ML model and/or the time consumed in uploading the update may consume too much of the certain duration of time to effectively generate the update locally at the client device. As a result, certain types of large global ML models (e.g., large automatic speech recognition (ASR) model(s), large language models (LLMs), etc. that have tens of millions of parameters, hundreds of millions of parameters, billions of parameters, and so on) are not conducive to being updated using decentralized learning. Accordingly, there is a need in the art for techniques that enable large global ML models to be updated in a decentralized manner.

SUMMARY

Implementations described herein are directed to a framework for decentralized learning of large global machine learning (ML) model(s). As used herein, these large global ML model(s) can include any ML model(s) that cannot be updated using decentralized learning unless a transferrable size of these global ML model(s) is reduced. Some non-limiting examples can include large global ML model(s) that, at full-size, include tens of millions of parameters, hundreds of millions of parameters, billions of parameters, tens of billions of parameters, and so on, such as full-size conformer automatic speech recognition (ASR) model(s), full-size large language model(s) (LLM(s)) (e.g., PaLM, ChatGPT, and/or other LLM(s)), and/or other full-sized generative model(s) or other full-sized ML model(s). Accordingly, not only does the framework described herein enable efficient updating of these large global ML model(s) on edge client devices, but also provide access to client data, in a privacy-sensitive manner, that may not otherwise be available, thereby improving quality of these large global ML model(s) upon deployment.

In various implementations, remote processor(s) of a remote system can identify a global ML model that is accessible at the remote system, selecting a plurality of client devices to participate in a given round of decentralized learning of the global ML model, and transmit, to each of the plurality of client devices, a processed version of the global ML model that is of a reduced transferrable size as compared to the global ML model. Further, client device processor(s) of a client device can receive the processed version of the global ML model, obtain corresponding client data, perform partial model training, based on processing the corresponding client data, for the processed version of the global ML model to generate a corresponding update for the global ML model, and transmit the corresponding update for the global ML model back to the remote system. Moreover, the remote processor(s) can update, based on the corresponding update that is received from the client device (and additional corresponding updates received from additional client devices selected for inclusion in the plurality of client devices), the global ML model. Notably, the partial model training that is performed may vary based on a type of the global ML model (e.g., whether the global ML model is a global ASR model, whether the global ML model is a global LLM, and so on), and may vary on a client device-by-client device basis.

In some implementations, and in selecting the plurality of client devices to participate in the given round of decentralized learning of the global ML model, the remote processor(s) can transmit, to a given client device, a corresponding request for whether the given client device has received corresponding feedback with respect to processing of corresponding client data using a corresponding on-device ML model that is an on-device version of the global ML model. Further, the remote processor(s) can receive, from the given client device, a corresponding response that is responsive to the request. In some versions of those implementations, and assuming that the given client device has received corresponding feedback with respect to processing of corresponding client data using a corresponding on-device ML model, the remote processor(s) can select the given client device for inclusion in the plurality of client devices to participate in the given round of decentralized learning of the global ML model. However, and assuming that the given client device has not received corresponding feedback with respect to processing of corresponding client data using a corresponding on-device ML model, the remote processor(s) can refrain from selecting the given client device for inclusion in the plurality of client devices to participate in the given round of decentralized learning of the global ML model. In some further versions of those implementations, the remote processor(s) can continue transmitting the corresponding requests to additional client devices until a threshold quantity of client devices have been selected for inclusion in the plurality of client devices to participate in the given round of decentralized learning of the global ML model, until a threshold quantity of corresponding requests have been transmitted, and/or until other criteria are satisfied.

For example, assume the global ML model is a global ASR model. In this example, the corresponding request transmitted to the given client device can be a corresponding request for whether a user of the given client device has provided an ASR correction to correct an ASR misrecognition generated by an on-device ASR model. Assume that a user provided a spoken utterance including the word "covid", but the on-device ASR model misrecognized "covid" as "covert". Further assume that the user of the given client device user subsequently changes "covert" to "covid". In this instance, "covert" can be considered the ASR misrecognition and "covid" can be considered the ASR correction. Accordingly, in this example, the corresponding response that is received at the remote system, and from the given client device, can indicate that the given client device has received corresponding feedback with respect to processing of the corresponding client data (e.g., the audio data capturing the spoken utterance including the word "covid") using the corresponding on-device ASR model. As a result, the remote processor(s) can select the given client device for inclusion in the plurality of client devices to participate in the given round of decentralized learning of the global ASR model.

As another example, assume the global ML model is a global LLM. In this example, the corresponding request transmitted to the given client device can be a corresponding request for whether a user of the given client device has provided a LLM correction to correct an LLM response generated by an on-device LLM. Assume that a user provided natural language input of "write me a 5 line poem", but the on-device LLM generates a 7 line poem instead of a 5 line poem as requested by the user. Further assume that the user of the given client device user subsequently provides additional natural language input of "that's a 7 line poem, but I requested a 5 line poem". In this instance, the additional natural language input can be considered an LLM correction to the LLM response that includes the wrong number of lines for the poem. Accordingly, in this example, the corresponding response that is received at the remote system, and from the given client device, can indicate that the given client device has received corresponding feedback with respect to processing of the corresponding client data (e.g., the natural language input of "write me a 5 line poem") using the corresponding on-device LLM. As a result, the remote processor(s) can select the given client device for inclusion in the plurality of client devices to participate in the given round of decentralized learning of the global LLM.

In some implementations, and prior to transmitting the processed version of the global ML model that is of a reduced transferrable size as compared to the global ML model to each of the plurality of client devices, the remote processor(s) generate the processed version of the global ML model. In some versions of those implementations, the remote processor(s) can quantize the global ML model to generate a quantized version of the global ML model as the processed version of the global ML model (e.g., using online model compression (OMC)). For instance, the remote processor(s) can quantize float32 variables of the global ML model to float16 (int8 or other smaller data types). However, in some instances, the remote processor(s) may only quantize float32 matrix variables of the global ML model to float16 while keeping the activations of the global ML model in float32 to enable the processed version of the global ML model to be more sensitive to activations. Not only does this reduce the transferrable size of the global ML model in transmitting the global ML model to each of the plurality of client devices, but it also reduces memory allocation required by each of the plurality of client device during the round of decentralized learning of the global ML model and reduces a size of the corresponding updates that are subsequently received by the remote system. In additional or alternative versions of those implementations, the remote processor(s) can prune or collapse layer(s) of the global ML model, prune global weight(s) of the global ML model, and/or prune other parameter(s) of the global ML model to generate a pruned version of the global ML model as the processed version of the global ML model. Similarly, not only does this reduce the transferrable size of the global ML model in transmitting the global ML model to each of the plurality of client devices, but it also reduces memory allocation required by each of the plurality of client device during the round of decentralized learning of the global ML model and reduces a size of the corresponding updates that are subsequently received by the remote system.

In some implementations, and in obtaining the corresponding client data, the client device processor(s) can filter a superset of corresponding client data to obtain the corresponding client data that is associated with corresponding feedback with respect to the prior processing of the corresponding client data using the corresponding on-device ML model. This filtering ensures that only the corresponding client data that is subsequently processed using the processed version of the global ML model is suitable for utilization in updating the global ML model. In other words, this filtering ensures that the corresponding client data is not polluted with bad training data.

Continuing with the above example where the global ML model is the global ASR model, the client device processor(s) can determine a word length difference between the ASR misrecognition generated by the on-device ASR model and an ASR correction that was provided by the corresponding user. In this example, and assuming that the word length difference is within a threshold word length distance, "covert" can be considered the ASR misrecognition and "covid" can be considered the ASR correction, and this correction pair (e.g., "covid" and "covert") can be utilized in generating the corresponding update for the global ASR model. In contrast, had the user changed "covert" to "covertcovid" (e.g., mistakenly forgetting to remove the "covert" portion), then "covertcovid" may not be considered an ASR correction.

Although the above example is described with respect to using word length difference to filter the corresponding client data, it should be understood that is for the sake of example and is not meant to be limiting. For example, the client device processor(s) can additionally, or alternatively, consider a semantic difference between the words, an acoustic similarity between the words, and/or utilize other techniques. In implementations where the client device processor(s) consider the semantic difference, the client device processor(s) can determine that there is an ASR correction to an ASR misrecognition if the semantic difference satisfies a semantic difference threshold. For instance, assume that the user provided a spoken utterance including the word "covid", the on-device ASR model recognized "covid" as "covert", but the user corrected "covert" to "illness". In this instance, changing "covert" to "illness" may simply be the user changing their mind and wanting to use the word "illness" instead of "covid", and this may not be considered an ASR correction to an ASR misrecognition since the terms are semantically similar. In implementations where the client device processor(s) consider the acoustic similarity, the client device processor(s) can determine that there is an ASR correction to an ASR misrecognition if the acoustic similarity satisfies an acoustic similarity threshold. For instance, assume that the user provided a spoken utterance including the word "covid", the on-device ASR model misrecognized "covid" as "covet", and the user corrected "covet" to "covid". In this instance, changing "covet" to "covid" may be considered an ASR correction to an ASR misrecognition based on the acoustic similarity between "covet" and "covid".

Continuing with the above example where the global ML model is the global LLM, the client device processor(s) can determine whether the additional natural language input is, in fact, provided to correct the LLM response that was generated using the on-device LLM. In this example, and assuming that the on-device LLM generates the 7 line poem instead of the 5 line poem as requested by the user, the additional natural language input may be considered a correction to be utilized in generating the corresponding update for the global ML model. In contrast, and assuming that the on-device LLM generates a 5 line poem instead as requested by the user, but the additional natural language input is still "that's a 7 line poem, but I requested a 5 line poem", the additional natural language input may not be considered a correction. Rather, in this instance, the user may simply be trying to test capabilities of the on-device LLM and/or trick the on-device LLM.

Although the above example is described with the additional natural language feedback being utilized as a signal for determining whether the corresponding client data that is associated with corresponding feedback with respect to the prior processing of the corresponding client data, it should be understood that is for the sake of example and is not meant to be limiting. Rather it should be understood that some other binary feedback may be utilized (e.g., a "thumbs up" or a "thumbs down"), where the binary feedback indicates that the LLM response is not responsive to the natural language input and/or is otherwise an insufficient response. In these instances, and although not as explicit of a signal as the natural language feedback, the binary feedback may still be utilized to identify the corresponding client data to be utilized in generating the corresponding update for the global ML model.

In some implementations, and in performing the partial model training for the processed version of the global ML model to generate a corresponding update for the global ML model based on processing the corresponding client data, the client device processor(s) can process, using the processed version of the global ML model, the corresponding client data to generate corresponding predicted output. Notably, the predicted output may vary based on a type of the global ML model, and the corresponding update that is transmitted back to the remote system may vary. As a result, and as indicated above, the partial model training that is performed may vary based on the type of the global ML model.

In implementations where the global ML model is the global ASR model and continuing with the above example for the global ASR model, the client device processor(s) can process, using a processed version of the global ASR model, corresponding audio data that captures the spoken utterance of the user of the client device (e.g., audio data that captures the user saying "covid") to generate the predicted output, such as a given speech hypothesis that is predicted to correspond to the spoken utterance (e.g., "covid", "covet", "covert", or some other given speech hypothesis that is predicted to correspond to the user saying "covid"). Further, the client device processor(s) can determine, based on the corresponding predicted output and the corresponding feedback that was previously received (e.g., the user of the given client device user subsequently changing "covert" to "covid"), a corresponding loss for the processed version of the global ASR model. Put another way, the ASR correction of "covid" can be utilized as a supervision signal to indicate that the corresponding predicted output should be "covid" and not "covet", "covert", etc. Moreover, the client device processor(s) can generate, based on the corresponding loss for the processed version of the global ASR model, a corresponding update for the global ML model. Furthermore, the client device processor(s) can transmit the corresponding update for the processed version of the global ASR model back to the remote system to cause the remote system to update the global ASR model.

In some versions of those implementations, and in generating the corresponding update for the global ML model based on the corresponding loss for the processed version of the global ASR model, the client device processor(s) can backpropagate the corresponding loss across the processed version of the global ML model to generate the corresponding update (e.g., using stochastic gradient descent). However, in some further versions of those implementations, and in backpropagating the corresponding loss across the processed version of the global ML model, the client device processor(s) can freeze a subset of layers, from among a plurality of layers, of the processed version of the global ASR model. For instance, the client device processor(s) can freeze bottom encoder layers of the processed version of the global ASR model without freezing top encoder layers, decoder layers, and/or other layers of the processed version of the global ASR model. However, and as noted above, the partial model training may vary on a client device-by-client device basis. Accordingly, additional client device processor(s) of an additional client device (e.g., that was also selected to participate in the given round of decentralized learning of the global ML model) can freeze decoder layers of the processed version of the global ASR model without freezing top encoder layers, bottom encoder layer(s), and/or other layers of the processed version of the global ASR model that were frozen by the client device processor(s) of the client device.

Further, in some additional or alternative further versions of those implementations, and prior to backpropagating the corresponding loss across the processed version of the global ML model, the client device processor(s) can dequantize the float16 variable back to float32 variables that were initially quantized by the remote system to reduce the transferable size thereof. This enables non-trainable variables to remain frozen during training while increasing the convergence speed of the global ASR model. Although particular partial model training techniques are described above with respect to the processed version of the global ASR model, it should be understood that these partial model training techniques are for the sake of example and are not meant to be limiting. For instance, in additional or alternative implementations, the partial model training can utilize a dropout technique or a pruning technique.

In some additional or alternative versions of those implementations, and in generating the corresponding update for the global ML model based on the corresponding loss for the processed version of the global ASR model, the remote processor(s) may design the weights of the processed version of the global ASR model in a manner that takes a distribution of the corresponding client data into consideration (e.g., based on the corresponding requests that the remote processor(s) transmit to select the plurality of client devices for inclusion in the given round of decentralized learning, or based on a separate decentralized learning task that is performed in parallel). Notably, the distribution of the corresponding client data utilized to update the global ASR model is unique in that it only contains errors from the corresponding on-device ASR models. Accordingly, if the ASR misrecognition of "covert" instead of "covid" as the user intended only appears once or a handful of times across the distribution of the corresponding client data, the corresponding client update for this should not be submerged when the corresponding client updates are aggregated at the remote system to update the global ASR model.

Accordingly, the remote processor(s) may design the weights of the processed version of the global ML model using one or more weighted client aggregation (WCA) techniques. The WCA techniques can include a frequency based weights technique, a frequency and accuracy based weights technique, a frequency, accuracy, and distribution based weights technique and/or other techniques that consider the distribution of the corresponding client data.

In implementations where the global ML model is the global ASR model, the frequency based weights technique causes each of the plurality of client devices to generate the corresponding update for the global ASR model based on: (i) a corresponding frequency of misrecognized words by the corresponding on-device ASR model across the plurality of client devices. This results in the corresponding client updates for rare words (e.g., in the above scenario where the ASR misrecognition of "covert" instead of "covid" as the user intended only appears once or a handful of times across the distribution of the corresponding client data) being given more weight since there are fewer corresponding updates for these misrecognitions, and the corresponding client updates for common words being given less weight since there are more corresponding updates for these misrecognitions. Further, the frequency and accuracy based weights technique causes each of the plurality of client devices to generate the corresponding update for the global ML model further based on: (ii) a corresponding accuracy of the misrecognized words by the corresponding on-device ASR model across the plurality of client devices. This results in the corresponding client updates for poorly recognized words being given more weight since there is a greater need to address these misrecognitions, and the corresponding client updates for better recognized words being given less weight since there is less of a need to address these misrecognitions. Moreover, the frequency, accuracy, and distribution based weights technique causes each of the plurality of client devices to generate the corresponding update for the global ML model further based on: (iii) a corresponding distribution of corrected words for the misrecognized words by the corresponding on-device ASR models across the plurality of client devices. This results in the corresponding client updates for common words in the distribution being given more weight and rare words in the distribution being given less weight during the given round of decentralized learning by calibrating the weights based on the corresponding distribution, which can account for variations of how common or rare words are across other distributions.

In implementations where the global ML model is the global LLM and continuing with the above example for the global LLM, the client device processor(s) can process, using a processed version of the global LLM, corresponding natural language input that was directed to the on-device LLM as the corresponding client data to generate a refined LLM response (e.g., refined relative to the initial LLM response for which the user of the given client device provided the corresponding feedback) that is predicted to be responsive to the natural language input. Further, the client device processor(s) can fine-tune, based on the refined LLM response, the processed version of the global LLM to generate a corresponding fine-tuned processed version of the global LLM. Moreover, the client device processor(s) can transmit the corresponding fine-tuned processed version of the global LLM back to the remote system as a corresponding update for the global LLM to cause the remote system to update the global LLM.

In some versions of those implementations, and in fine-tuning the processed version of the global LLM, the client device processor(s) can freeze a subset of layers, from among a plurality of layers, of the processed version of the global LLM. For instance, the client device processor(s) can freeze various encoder layers of the processed version of the global LLM, various decoder layers of the processed version of the global LLM, and/or various other layers of the processed version of the global LLM, and without freezing top other layers of the processed version of the global LLM. However, and as noted above, the partial model training may vary on a client device-by-client device basis. Accordingly, additional client device processor(s) of an additional client device (e.g., that was also selected to participate in the given round of decentralized learning of the global ML model) can freeze other layers of the processed version of the global LLM (e.g., that were not frozen by the client device processor(s) of the client device) without freezing some other layers of the processed version of the global LLM (e.g., that were frozen by the client device processor(s) of the client device).

Further, in some additional or alternative versions of those implementations, and prior to fine-tuning the processed version of the global LLM, the client device processor(s) can dequantize various aspects of the processed version of the global LLM that were initially quantized by the remote system to reduce a transferable size thereof. This enables non-trainable variables to remain frozen during training while increasing the convergence speed of the global LLM. Although particular partial model training techniques are described above with respect to the global LLM, it should be understood that these partial model training techniques are for the sake of example and are not meant to be limiting. For instance, in additional or alternative implementations, the partial model training can utilize a dropout technique or a pruning technique.

In some additional or alternative versions of those implementations, and in generating the corresponding update for the global ML model based on the corresponding loss for the processed version of the global LLM, the remote processor(s) may design the weights of the processed version of the global LLM in a manner that takes a distribution of the corresponding client data into consideration (e.g., based on the corresponding requests that the remote processor(s) transmit to select the plurality of client devices for inclusion in the given round of decentralized learning, or based on a separate decentralized learning task that is performed in parallel). Notably, the distribution of the corresponding client data utilized to update the global ASR model is unique in that it only contains natural language inputs and LLM response pairs where the user indicated that the LLM response is unsatisfactory. Accordingly, if the LLM response fails to follow an explicit instruction included in the natural language input, fails to follow implicit writing principles that should be utilized in generating the LLM response, fails to provide a desired level of specificity, includes factually inaccurate information, etc., the corresponding client update (e.g., the corresponding fine-tuned processed version of the global LLM) can be weighted differently to ensure that it is not submerged when the corresponding client updates are aggregated at the remote system to update the global LLM. Accordingly, the remote processor(s) may design the weights of the processed version of the global ML model using one or more of the weighted client aggregation (WCA) techniques described above.

In implementations where the global ML model is the global LLM, the frequency based weights technique causes each of the plurality of client devices to generate the corresponding update for the global ASR model based on: (i) a corresponding frequency of the LLM response failing to follow an explicit instruction included in the natural language input, failing to follow implicit writing principles that should be utilized in generating the LLM response, failing to provide a desired level of specificity, including factually inaccurate information, and so on. This results in the corresponding client updates for rare shortcomings (e.g., in the above scenario where the LLM response failing to follow a particular instruction included in the natural language input only appearing once or a handful of times across the distribution of the corresponding client data) being given more weight since there are fewer corresponding updates for these failures, and the corresponding client updates for more common failures being given less weight since there are more corresponding updates for these shortcomings. Further, the frequency and accuracy based weights technique causes each of the plurality of client devices to generate the corresponding update for the global ML model further based on: (ii) a corresponding accuracy of the LLM response including particular words (e.g., from among a distribution of tokens generated by the corresponding on-device ML models on which the LLM response is generated) that result in the LLM response failing to follow an explicit instruction included in the natural language input, failing to follow implicit writing principles that should be utilized in generating the LLM response, failing to provide a desired level of specificity, including factually inaccurate information, and so on. This results in the corresponding client updates for poorly generated LLM responses being given more weight since there is a greater need to address these poor LLM responses, and the corresponding client updates for better LLM responses (although still inadequate) being given less weight since there is less of a need to address these inadequacies. Moreover, the frequency, accuracy, and distribution based weights technique causes each of the plurality of client devices to generate the corresponding update for the global ML model further based on: (iii) a corresponding distribution of corrected LLM responses that are generated by the corresponding on-device LLM models across the plurality of client devices. This results in the corresponding client updates for common LLM responses in the distribution being given more weight and rare LLM responses in the distribution being given less weight during the given rounds of decentralized learning by calibrating the weights based on the corresponding distribution, which can account for variations of how common or rare LLM responses are across other distributions.

In some implementations, and subsequent to updating the global ML model based on the corresponding update that is received from the client device (and additional corresponding updates received from additional client devices selected for inclusion in the plurality of client devices), the remote processor(s) can determine whether one or more conditions are satisfied. In response to determining that the one or more conditions are satisfied, the remote processor(s) can cause the global ML model to be deployed. Otherwise, the remote processor(s) can select a plurality of additional client devices to participate in a given additional round of decentralized learning of the global ML model, and continue updating the global ML model. The one or more conditions can include whether performance of the global ML model satisfies a performance threshold, whether a threshold quantity of corresponding updates have been utilized to update the global ML model, whether a threshold quantity of rounds of decentralized learning of the global ML model have been performed, and/or other conditions.

The above description is provided as an overview of only some implementations disclosed herein. Those implementations, and other implementations, are described in additional detail herein.

BRIEF DESCRIPTION OF THE DRAWINGS

FIG. 3 depicts a flowchart illustrating a method of server-side functionality for updating large global machine learning (ML) model(s), in accordance with various implementations.

FIG. 4 depicts a flowchart illustrating a method of client-side functionality for updating large automatic speech recognition (ASR) model(s), in accordance with various implementations.

FIG. 5 depicts a flowchart illustrating a method of client-side functionality for updating large language model(s) (LLM(s)), in accordance with various implementations.

DETAILED DESCRIPTION

Figure 1:
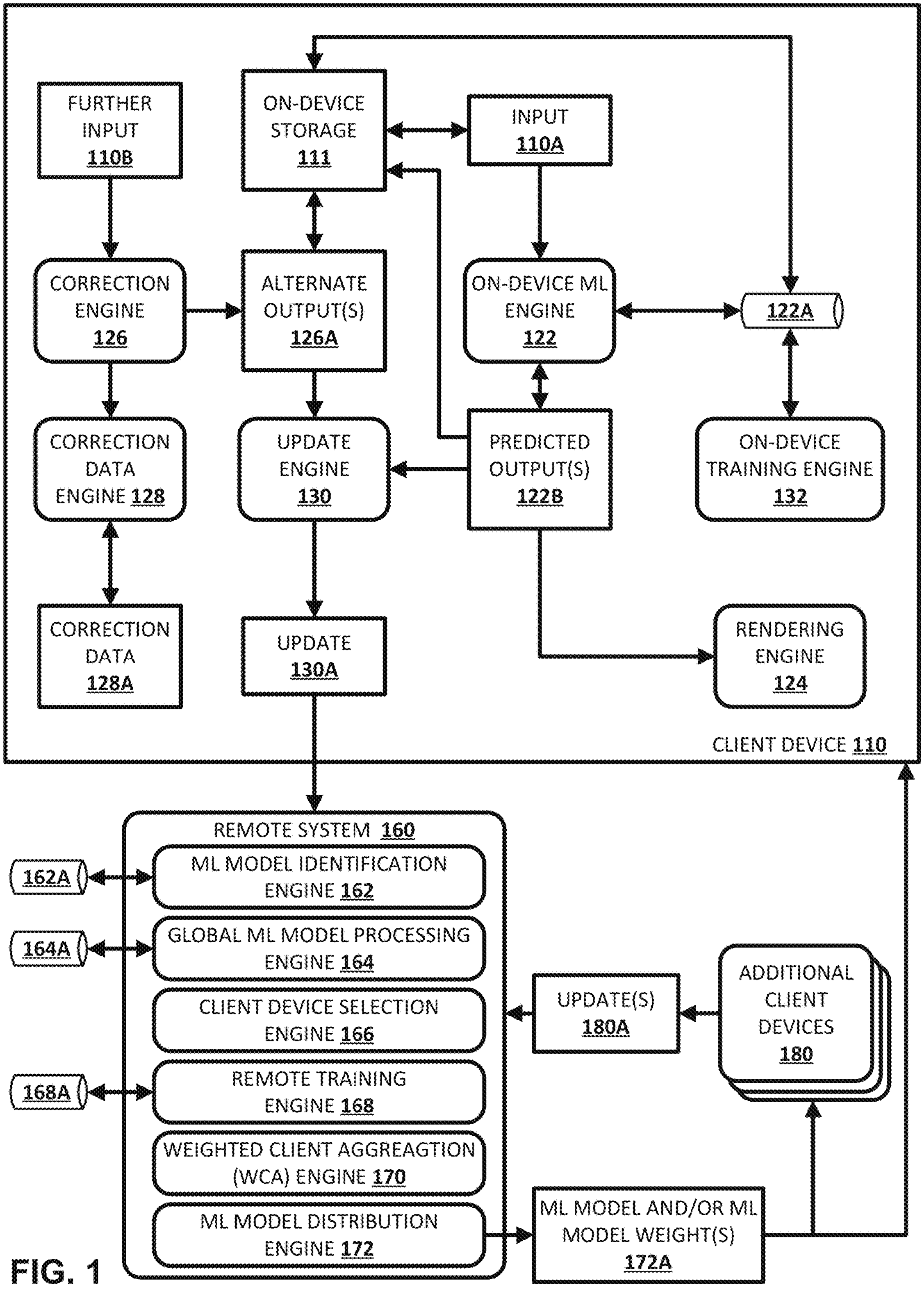
FIG. 1 depicts an example process flow that demonstrates various aspects of the present disclosure, in accordance with various implementations.

Turning now to FIG. 1, an example process flow that demonstrates various aspects of the present disclosure is depicted. A client device 110 is illustrated in FIG. 1, and includes the components that are encompassed within the box of FIG. 1 that represents client device 110. Further, a remote system 160 is illustrated in FIG. 1, and includes the components that are encompassed within the box in FIG. 1 that represents the remote system 160. The client device 110 and the remote system 160 can be communicatively coupled, for example, over one or more networks (e.g., as described with respect to FIG. 2), and optionally with other additional client devices 180.

On-device machine learning (ML) engine 122 may receive input 110A, such as a spoken utterance of a user of the client device 110 and that is captured in audio data generated via one or more microphones of the client device 110, typed or touch input of a user of the client device 110 and that is captured in textual data generated via a keyboard (virtual or real) of the client device 110, and/or other input(s) that are received at the client device 110, such as vision data, sensor data, etc., The on-device ML engine 122 may process the input 110A, using an on-device ML model 122A that is local to the client device 110, to generate one or more predicted outputs 122B. Further, rendering engine 124 may cause one or more of the predicted outputs 122B to be visually rendered at the client device 110 (e.g., via a display of the client device 110) and/or audibly rendered at the client device 110 (e.g., via speaker(s) of the client device 110). Notably, the one or more predicted outputs 122B that are generated by the on-device ML engine 122 may depend on the input 110A and/or a type of the on-device ML model 122A that is utilized to process the input 110A.

For example, when input 110A is audio data that captures a spoken utterance of a user of the client device 110A, the on-device ML model 122A may be an on-device ASR model. In some implementations, the on-device ASR model may be end-to-end speech recognition model. In these implementations, the on-device ML engine 122 generates one or more predicted textual segments, as the one or more predicted outputs 122B, directly using the on-device ASR model (e.g., the one or more predicted outputs 122B may correspond to the one or more predicted textual segments). For instance, the on-device ASR model may be an end-to-end model used to generate the one or more predicted textual segment on a character-by-character basis (or other token-by-token basis) as the one or more predicted outputs 122B. One non-limiting example of such an end-to-end model used to generate the one or more predicted textual segments on a character-by-character basis is a recurrent neural network transducer (RNN-T) model. An RNN-T model is a form of sequence-to-sequence model that does not employ attention mechanisms. Unlike most sequence-to-sequence models, which typically need to process the entire input sequence (e.g., an audio data waveform, mel-frequency cepstral coefficients (MFCCs), or other representations of the audio data) to produce the one or more predicted textual segments as the one or more predicted outputs 122B, an RNN-T model can be used to continuously process input samples and stream output symbols (e.g., characters of the alphabet).

In additional or alternative implementations, the on-device ASR model may not be an end-to-end speech recognition model. In these implementations, the on-device ML engine 122 may instead generate one or more predicted textual segments, as the one or more predicted outputs 122B, indirectly using the on-device ASR model. For instance, the one or more predicted outputs 122B may be one or more predicted phonemes and/or other representations, and may generate the one or more textual segments based on the one or more predicted phonemes or other representations. For instance, with such models, one or more predicted phonemes and/or other representations may be utilized by the on-device ML engine 122 to determine the one or more predicted textual segments that conform to the one or more predicted phonemes. In doing so, the on-device ML engine 122 may optionally employ a decoding graph, a lexicon, and/or other resource(s).

As another example, when the input 110A is directed to a large language model (LLM), the on-device ML model 122A may be an on-device LLM. In some implementations, the input 110A may be typed or touch input that is directed to the on-device LLM, whereas in other implementations, the input 110A may be audio data that captures a spoken utterance of a user of the client device 110 that is directed to the on-device LLM and that is optionally converted to one or more predicted textual segments (e.g., using an on-device ASR model as described above) prior to being provided to the on-device LLM. In these implementations, the on-device ML engine 122 generates an LLM response, as the one or more predicted outputs 122B, using the on-device LLM (e.g., the one or more predicted outputs 122B may correspond to the LLM response). For instance, the on-device LLM may be an end-to-end model used to generate the LLM response based on a probability distribution over a sequence of tokens, such as words, phrases, or other semantic units, that are predicted to be responsive to the input 110A. Notably, the LLM can include billions of weights and/or parameters that are learned through training the LLM on enormous amounts of diverse data. This enables the LLM to generate the LLM output as the probability distribution over the sequence of tokens. One non-limiting example of such an on-device LLM used to generate the LLM response based on the probability distribution over the sequence of tokens is PaLM 2 Gecko that can be operated locally at the client device 110. However, it should be understood that any other LLM capable of being operated locally at the client device 110 is contemplated herein, and that these LLMs can be encoder-only based, decoder-only based, sequence-to-sequence based and that optionally includes an attention mechanism or other memory.

In various implementations, further input 110B that is received subsequent to the input 110A initially provided by the user of the client device 110 may be received at the client device 110, and may provide corresponding feedback with respect to the initial processing of the input 110A. The further input 110B may include, for example, touch input and/or typed input directed to the display of the client device 110 and/or a spoken utterance captured in audio data generated by the one or more microphones of the client device 110. In implementations where the on-device ML model engine 122 processed the input 110A using the on-device ASR model, correction engine 126 may analyze the further input 110B to determine whether the further input 110B modifies a portion of the one or more predicted outputs 122B (e.g., the one or more predicted textual segments) to one or more alternate outputs 126A (e.g., one or more alternate textual segments). Further, and assuming that the further input 110B modifies a portion of the one or more predicted outputs 122B to one or more alternate outputs 126A, correction data engine 128 may generate correction data 128A that includes at least the portion of the one or more predicted outputs 122B that were modified and the one or more alternate outputs 126A. Moreover, the correction data engine 128 may cause the correction data 128A to be stored in the on-device storage 111 of the client device 110, and along with the input 110A (e.g., the audio data that processed to initially generate the one or more predicted textual segments) may be stored in the on-device storage 111 of the client device 110, and in association with the correction data 128A.

In implementations where the on-device ML model engine 122 processed the input 110A using the on-device LLM, the correction engine 126 may analyze the further input 110B to determine whether the further input 110B indicates that the LLM response that was generated based on the input 110A is unsatisfactory. For example, the further input 110B may indicate that the LLM response fails to follow an explicit instruction included in the input 110A, fails to follow implicit writing principles that should be utilized in generating the LLM response, fails to provide a desired level of specificity, includes factually inaccurate information, etc. In this example, the on-device LLM may generate an additional LLM response that corrects the unsatisfactory response and can be utilized at the one or more alternate output(s) 126A. Further, and assuming that the further input 110B indicates that the LLM response generated as the one or more predicted outputs 122B is unsatisfactory, the correction data engine 128 may generate the correction data 128A that includes at least the LLM response as the one or more predicted outputs 122B that was determined to be unsatisfactory based on the further input 110B and/or and the additional LLM response. Moreover, the correction data engine 128 may cause the correction data 128A to be stored in the on-device storage 111 of the client device 110, and along with the input 110A (e.g., the touch or typed input that processed to initially generate the LLM response, the audio data, etc.) may be stored in the on-device storage 111 of the client device 110, and in association with the correction data 128A.

In various implementations, a ML model identification engine 162 may identify a global ML model 162A that is to be updated during a given round of decentralized learning of the global ML model. The global ML model to be updated during the given round of decentralized learning of the global ML model can be, for example, a large global ML model. As used herein, the large global ML model can include any ML model that cannot be updated using decentralized learning unless a transferrable size of the global ML model is reduced. Some non-limiting examples can include a large global ML model that, at full-size, include tens of millions of parameters, hundreds of millions of parameters, billions of parameters, tens of billions of parameters, and so on, such as full-size conformer ASR model, full-size large LLM(s) (LLM(s)) (e.g., other versions of PaLM, BARD, BERT, LaMDA, Meena, GPT)) and/or other full-sized generative model(s) or other ML model(s). Accordingly, not only does the framework described herein enable efficient updating of the large global ML model on edge client devices (e.g., the client device 110 and/or the additional client device(s) 180), but also provide access to client data, in a privacy-sensitive manner, that may not otherwise be available, thereby improving quality of the large global ML model(s) upon deployment. The ML model identification engine 162 may identify the global ML model 162A based on, for example, developer input received from a developer associated with the remote system 160.

Further, global ML model processing engine 164 may process the global ML model 162A to generate a processed version of the global ML model 164A. In some implementations, the global ML model processing engine 164 can quantize the global ML model 162A to generate a quantized version of the global ML model as the processed version of the global ML model 164A (e.g., using online model compression (OMC)). For instance, the global ML model processing engine 164 can quantize float32 variables of the global ML model 162A to float16. However, in some instances, the global ML model processing engine 164 may only quantize float32 matrix variables of the global ML model 162A to float16 while keeping the activations of the global ML model 162A in float32 to enable the processed version of the global ML model 164A to be more sensitive to activations. Not only does this reduce the transferrable size of the global ML model 162A in subsequently transmitting the global ML model 162A to the client device 110 and the additional client devices 180, but it also reduces memory allocation required by the client device 110 and the additional client devices 180 during the round of decentralized learning of the global ML model 162A and reduces a size of updates that are subsequently received by the remote system 160.

In additional or alternative implementations, the global ML model processing engine 164 can prune or collapse layer(s) of the global ML model 162A, prune global weight(s) of the global ML mode 162AI, and/or prune other parameter(s) of the global ML model 162A to generate a pruned version of the global ML model as the processed version of the global ML model 164A. Similarly, not only does this reduce the transferrable size of the global ML model 162A in transmitting the global ML model 162A to the client device 110 and the additional client devices 180, but it also reduces memory allocation required by the client device 110 and the additional client devices 180 during the round of decentralized learning of the global ML model 162A and reduces a size of the updates that are subsequently received by the remote system 160.

Moreover, client device selection engine 166 can select a plurality of client devices to participate in the given round of decentralized learning of the global ML model 162A. In selecting the plurality of client devices to participate in the given round of decentralized learning of the global ML model 162A, the client device selection engine 166 can generate and transmit, to the client device 110, a corresponding request for whether the client device 110 has received corresponding feedback with respect to processing of corresponding client data using a corresponding on-device ML model that is an on-device version of the global ML model 162A. Further, the client device selection engine 166 can receive, from the client device 110, a corresponding response that is responsive to the request. In some implementations, and assuming that the client device 110 has received feedback with respect to processing of client data using an on-device ML model that is of the same type as the global ML model 162A, the client device selection engine 166 can select the client device 110 for inclusion in the plurality of client devices to participate in the given round of decentralized learning of the global ML model 1662A (e.g., based on the corresponding response). However, and assuming that the client device 110 has not received feedback with respect to processing of client data using an on-device ML model that is of the same type as the global ML model 162A, the client device selection engine 166 can refrain from selecting the client device 110 for inclusion in the plurality of client devices to participate in the given round of decentralized learning of the global ML model 162A. In some further versions of those implementations, the client device selection engine 166 can continue transmitting the corresponding requests to one or more of the additional client devices 180 until a threshold quantity of client devices have been selected for inclusion in the plurality of client devices to participate in the given round of decentralized learning of the global ML model 162A, until a threshold quantity of corresponding requests have been transmitted, and/or until other criteria are satisfied.

For example, assume the global ML model 162A is a global ASR model. In this example, the corresponding request transmitted to the client device 110 (and/or one or more of the additional client devices 180) can be a corresponding request for whether a user of the client device 110 has provided an ASR correction to correct an ASR misrecognition generated by an on-device ASR model (e.g., based on the further input 110B described above with respect to the correction engine 126). Assuming that a user of the client device 110 provided the further input 110B to correct the ASR misrecognition generated by the on-device ASR model, the corresponding response that is received by the client device selection engine 166 can indicate that the client device 110 has received the feedback with respect to processing of the client data (e.g., the audio data capturing the spoken utterance) using the on-device ASR model. As a result, the client device selection engine 166 can select the client device 110 for inclusion in the plurality of client devices to participate in the given round of decentralized learning of the global ASR model.

As another example, assume the global ML model 162A is a global LLM. In this example, the corresponding request transmitted to the client device 110 (and/or one or more of the additional client devices 180) can be a corresponding request for whether a user of the client device has provided a LLM correction to correct an LLM response generated by an on-device LLM (e.g., based on the further input 110B described above with respect to the correction engine 126). Assuming that a user of the client device 110 provided the further input 110B to indicate that the LLM response that is generated is insufficient, the corresponding response that is received by the client device selection engine 166 can indicate that the client device 110 has received the feedback with respect to processing of the client data (e.g., the audio data capturing the spoken utterance, the typed input capturing a prompt or query, etc.) using the on-device LLM. As a result, the client device selection engine 166 can select the client device 110 for inclusion in the plurality of client devices to participate in the given round of decentralized learning of the global LLM.

In various implementations, and subsequent to the client device selection engine 166 selecting the plurality of client devices to participate in the given round of decentralized learning of the global ML model 162A, remote training engine 168 can perform the given round of decentralized learning of the global ML model 162A. For example, the remote training engine 168 can implement Algorithm 1:

Line (1) the remote system 160 sends the processed version of the global ML model 164A to the plurality of client device devices.

Line (2) for each client $i \in n$ in parallel do:

Line (3) filter a superset of corresponding client data to form a batch of corresponding client data;

Line (4) for each instance of the corresponding client data $E_j$ in the batch do:

Line (5) compute $w_{ij}$ for the instance of the corresponding client data $E_j$;

Line (6) end for

Line (7) $G_i = \Sigma_j G_{ij} w_{ij}$

Line (8) $w_i = \Sigma_j w_{ij}$

Line (9) end for

Line (10) update the global ML model 162A by $$\sum_{i=1}^{n} G_i w_i / \sum_{i=1}^{n} w_i$$

to generate an updated global ML model 168A.

Notably, and in the context of Algorithm 1, the client device 110 can be the client device i assuming it was selected for inclusion in the plurality of client devices n to participate in the given round of decentralized learning of the global ML model 162A. Initially, the client device 110 can receive the processed version of the global ML model 164A (and as indicated at Line (1)). Further, the client device 110 can obtain all of the correction data stored in the on-device storage 111 of the client device 110 (e.g., a superset of corresponding client data). However, on-device training engine 132 may only selectively process a subset of the superset of corresponding client data (and as indicated at Line (3)). For instance, the on-device training engine 132 may only cause instances of corresponding client data that are determined, in fact, to be directed to performance of the on-device ML model to be processed in generating an update 130A (e.g., as described in more detail with respect to FIGS. 6A-6B and 7A-7B). In this manner, the on-device training engine 132 only allows the processed version of the global ML model 164A that is received at the client device 110 to process "good" data to ensure the on-device ML model is efficiently improved.

Further, and in the context of Algorithm 1, the on-device training engine 132 may cause a given instance of the corresponding client data (e.g. $E_j$ in Algorithm 1) to be processed using the processed version of the global ML model 164A, and update engine 130 may generate an update 130A for the global ML model 162A based on the processing the given instance of the corresponding client data and using the processed version of the global ML model 164A (and as indicated at Lines (4) and (5)). Similar to the on-device ML engine 122 described above, processing the given instance of the corresponding client data and generating the update 130A may depend on the given instance of the corresponding client data and/or a type of the processed version of the global ML model 164A. In implementations where the given instance of the corresponding client data is based on prior processing by the on-device ASR model and/or the type of the processed version of the global ML model 164A is the processed version of the global ASR model, the on-device training engine 132 can process, using the processed version of the global ASR model, the audio data that captured the input 110A to generate one or more training predicted outputs, and utilize the one or more alternate outputs 126A as a supervision signal for generating a loss (e.g., by comparing the one or more training predicted output to the one or more alternate predicted outputs 126A). Further, the update engine 130 can generate the update 130A based on the loss, and cause the update 130A to be transmitted to the remote system.

Similarly, in implementations where the given instance of the corresponding client data is based on prior processing by the on-device LLM and/or the type of the processed version of the global ML model 164A is the processed version of the global LLM, the on-device training engine 132 can process, using the processed version of the global LLM, the textual data corresponding to the input 110A to generate a training LLM response as the one or more training predicted outputs, and utilize the one or more alternate outputs 126A and/or a refined LLM response as a supervision signal for generating a loss (e.g., by comparing the one or more training predicted output to the one or more alternate predicted outputs 126A). Further, the update engine 130 can generate the update 130A based on the loss, and cause the update 130A to be transmitted to the remote system. However, it should be understood that other techniques exist for generating the update 130A for the processed version of the global LLM 164A (e.g., on-device fine-tuning of the processed version of the global LLM as described with respect to FIG. 5). Notably, and as indicated by Algorithm 1 (Lines (4) and (6)), this process can be repeated for each of the instances of client data that are included in the subset of the superset of corresponding client data.

Moreover, as indicated by Algorithm 1 (Line (7)), the update 130A can include gradient(s) $G_i$ for processed global weight(s) of the processed version of the global ML model 164A. The gradient(s) $G_i$ represent a value of a loss function for all of the instances of the corresponding client data that are processed at the client device. In simple terms, the gradient(s) $G_i$ indicate a direction in a lower dimensional space such that the update 130A should move the global weight(s) of the global ML model 162A to improve precision and/or recall of the global ML model 162A. In generating the gradient(s) $G_i$, the update engine 130A can backpropagate the loss(es) across the processed version of the global ML model 164A. However, in backpropagating the loss(es) across the processed version of the global ML model 164A, the update engine 130 can freeze various portions of the processed version of the global ML model 164A at the client device 110 (whereas other portions of the processed version of the global ML model 164A can be freezed at one or more of the additional client devices 180), dequantize certain variables of the processed version of the global ML model 164A, and/or perform other operations that result in partial model training of the processed version of the global ML model 164A.

Furthermore, as indicated by Algorithm 1 (Line (8)), the update 130A can additionally include weight(s) $w_i$ for the gradient(s) $G_i$. The weight(s) $w_i$ indicate an extent to which the gradient(s) $G_i$ should move the global weight(s) of the global ML model 162A in the lower dimensional space such that the update 130A does not cause the global ML model 162A to be overfit or underfit to the corresponding client data. Accordingly, in various implementations, and in addition to transmitting the processed version of the global ML model 164A to the client device, weighted client aggregation (WCA) engine 170 can design the weight(s) of the processed version of the global ML model 164A using various WCA techniques on a client device-by-client device basis for each of the client devices that are selected for inclusion in the given round of decentralized learning of the global ML model 162. The WCA techniques can include, for example, a frequency based weights technique (represented by Equation 1 below); a frequency and accuracy based weights technique (represented by Equation 2 below); a frequency, accuracy, and distribution based weights technique (represented by Equation 3 below); and/or other WCA techniques.

$$w_{ij} = \sum_{k=1}^{l} \frac{1}{freq_k} \quad \text{(Equation 1)}$$

$$w_{ij} = \sum_{k=1}^{l} \frac{1 - acc_k}{freq_k} \quad \text{(Equation 2)}$$

$$w_{ij} = \sum_{k=1}^{l} \frac{1 - acc_k}{freq_k} Pr(w) \quad \text{(Equation 3)}$$

Notably, the frequency $freq_k$, accuracy $acc_k$, and distribution Pr(w) can be determined during the given round of decentralized learning of the global ML model 162A, or during a separate decentralized learning task that is performed in parallel with the given round of decentralized learning of the global ML model 162A. Further, the WCA methods may vary based on a type of the global ML model 162A.

In implementations where the global ML model 162A is the global ASR model, the frequency based weights technique (Equation 1) causes the client device 110 to generate update 130A for the global ASR model 162A based on: (i) a corresponding frequency of misrecognized words by the corresponding on-device ASR model across the plurality of client devices (e.g., the client device 110 and one or more of the additional client devices 180). This results in updates for rare words being given more weight since there are fewer updates for these misrecognitions, and updates for common words being given less weight since there are more updates for these misrecognitions. Further, the frequency and accuracy based weights technique (Equation 2) causes the client device 110 to generate update 130A for the global ASR model 162A further based on: (ii) a corresponding accuracy of the misrecognized words by the corresponding on-device ASR model across the plurality of client devices (e.g., the client device 110 and one or more of the additional client devices 180). This results in updates for poorly recognized words being given more weight since there is a greater need to address these misrecognitions, and updates for better recognized words being given less weight since there is less of a need to address these misrecognitions. Moreover, the frequency, accuracy, and distribution based weights technique (Equation 3) causes the client device 110 to generate update 130A for the global ASR model 162A further based on: (iii) a corresponding distribution of corrected words for the misrecognized words by the corresponding on-device ASR models across the plurality of client devices (e.g., the client device 110 and one or more of the additional client devices 180). This results in updates for common words in the distribution being more weight and rare words in the distribution being given less weight by calibrating the weights in the context of other distributions.

In implementations where the global ML model is the global LLM, the frequency based weights technique (Equation 1) causes the client device 110 to generate update 130A for the global LLM 162A based on: (i) a corresponding frequency of the LLM response failing to follow an explicit instruction included in the input 110A, failing to follow implicit writing principles that should be utilized in generating the LLM response, failing to provide a desired level of specificity, including factually inaccurate information, and so on across the plurality of client devices (e.g., the client device 110 and one or more of the additional client devices 180). This results in updates for rare shortcomings being given more weight since there are fewer updates for these failures, and updates for more common failures being given less weight since there are more updates for these shortcomings. Further, the frequency and accuracy based weights technique (Equation 2) causes the client device 110 to generate update 130A for the global LLM 162A further based on: (ii) a corresponding accuracy of the LLM response including particular words (e.g., from among a distribution of tokens generated by the corresponding on-device ML models on which the LLM response is generated) that result in the LLM response failing to follow an explicit instruction included in the input 110A, failing to follow implicit writing principles that should be utilized in generating the LLM response, failing to provide a desired level of specificity, including factually inaccurate information, and so on across the plurality of client devices (e.g., the client device 110 and one or more of the additional client devices 180). This results in updates for poorly generated LLM responses being given more weight since there is a greater need to address these poor LLM responses, and updates for better LLM responses (although still inadequate) being given less weight since there is less of a need to address these inadequacies. Moreover, the frequency, accuracy, and distribution based weights technique (Equation 3) causes the client device 110 to generate update 130A for the global LLM 162A further based on: (iii) a corresponding distribution of corrected LLM responses that are generated by the corresponding on-device LLM models across the plurality of client devices (e.g., the client device 110 and one or more of the additional client devices 180). This results in updates for common LLM responses in the distribution being more weight and rare LLM responses in the distribution being given less weight by calibrating the weights in the context of other distributions.

Upon receiving the update 130A (and additional update(s) 180A from one or more of the additional client devices 180 that are also participating in the given round of decentralized learning of the global ML model 162A), the remote training engine 168 can update the global ML model 162A to generate the updated global ML model 168A (as indicated by Line (10) of Algorithm 1). The remote system 160 can utilize the various engines described herein and Algorithm 1 to perform additional rounds of decentralized learning of the global ML model 162A until one or more conditions are satisfied. In response to determining that the one or more conditions are satisfied, the remote system 160 can cause the global ML model 162 to be deployed (e.g., via update distribution engine 172 and as indicated by 172A). Otherwise, the remote system 160 can select a plurality of additional client devices to participate in a given additional round of decentralized learning of the global ML model, and continue updating the global ML model 162A. The one or more conditions can include whether performance of the updated global ML model 168A satisfies a performance threshold, whether a threshold quantity of corresponding updates have been in generating the updated global ML model 168A, whether a threshold quantity of rounds of decentralized learning have been performed, and/or other conditions. Although Algorithm 1 is depicted as including certain steps in a particular order, it should be understood that is for the sake of example and is not meant to be limiting. For example, one or more steps may be reordered, omitted, or added.

Figure 2:
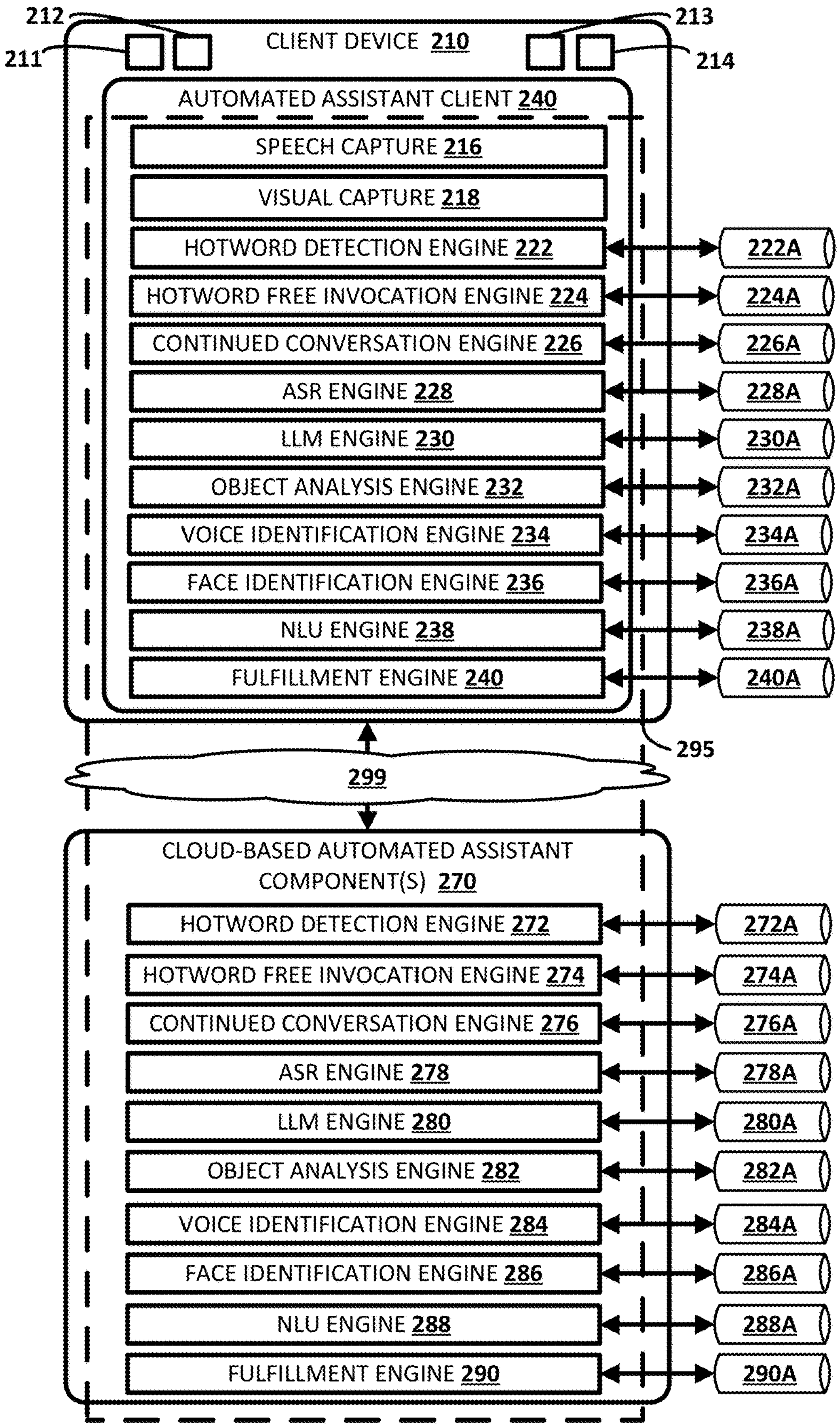
FIG. 2 is a block diagram of an example environment, in accordance with various implementations.

Turning now to FIG. 2, a client device 210 is illustrated in an implementation where various on-device ML engines are included as part of (or in communication with) an automated assistant client 240 is depicted. The respective on-device ML models are also illustrated interfacing with the various on-device ML engines. Other components of the client device 210 are not illustrated in FIG. 2 for simplicity. FIG. 2 illustrates one example of how the various on-device ML engines of and their respective ML models can be utilized by the automated assistant client 240 in performing various actions.

The client device 210 in FIG. 2 is illustrated with one or more microphones 211, one or more speakers 212, one or more vision components 213, and display(s) 214 (e.g., a touch-sensitive display). The client device 210 may further include pressure sensor(s), proximity sensor(s), accelerometer(s), magnetometer(s), and/or other sensor(s) that are used to generate other sensor data that is in addition to audio data captured by the one or more microphones 211. The client device 210 at least selectively executes the automated assistant client 240. The automated assistant client 240 includes, in the example of FIG. 2, hotword detection engine 222, hotword free invocation engine 224, continued conversation engine 226, ASR engine 228, LLM engine 230, object analysis engine 232, voice identification engine 234, and face identification engine 236. The automated assistant client 240 further includes speech capture engine 216, and visual capture engine 218. It should be understood that the on-device ML engines and on-device ML models depicted in FIG. 2 are provided for the sake of example, and are not meant to be limiting. For example, the automated assistant client 240 can further include additional and/or alternative on-device ML engines, such as a text-to-speech (TTS) engine and a respective on-device TTS model, a voice activity detection (VAD) engine and a respective on-device VAD model, an endpoint detector engine and a respective on-device endpoint detector model, a lip movement engine and a respective on-device lip movement model, and/or other on-device engine(s) along with associated on-device ML model(s). Moreover, it should be understood that one or more of the on-device ML engines and/or on-device ML models described herein can be combined, such that a single on-device ML engine and/or on-device ML model can perform the functions of multiple on-device ML engines and/or on-device ML models described herein.

One or more cloud-based automated assistant components 270 can optionally be implemented on one or more computing systems (collectively referred to as a "cloud" computing system) that are communicatively coupled to client device 210 via one or more of the networks described with respect to FIG. 1 as indicated generally by 299. The cloud-based automated assistant components 270 can be implemented, for example, via a cluster of high-performance servers. In various implementations, an instance of an automated assistant client 240, by way of its interactions with one or more cloud-based automated assistant components 270, may form what appears to be, from a user's perspective, a logical instance of an automated assistant as indicated generally by 295 with which the user may engage in a human-to-computer interactions (e.g., spoken interactions, gesture-based interactions, and/or touch-based interactions).

The client device 210 can be, for example: a desktop computing device, a laptop computing device, a tablet computing device, a mobile phone computing device, a computing device of a vehicle of the user (e.g., an in-vehicle communications system, an in-vehicle entertainment system, an in-vehicle navigation system), a standalone interactive speaker, a smart appliance such as a smart television (or a standard television equipped with a networked dongle with automated assistant capabilities), and/or a wearable apparatus of the user that includes a computing device (e.g., a watch of the user having a computing device, glasses of the user having a computing device, a virtual or augmented reality computing device). Additional and/or alternative client devices may be provided.

The one or more vision components 213 can take various forms, such as monographic cameras, stereographic cameras, a LIDAR component (or other laser-based component(s)), a radar component, etc. The one or more vision components 213 may be used, e.g., by the visual capture engine 218, to capture image data corresponding to vision frames (e.g., image frames, laser-based vision frames) of an environment in which the client device 210 is deployed. In some implementations, such vision frame(s) can be utilized to determine whether a user is present near the client device 210 and/or a distance of the user (e.g., the user's face) relative to the client device 210. Such determination(s) can be utilized, for example, in determining whether to activate the various on-device ML engines depicted in FIG. 2, and/or other on-device ML engine(s). Further, the speech capture engine 218 can be configured to capture a user's spoken utterance(s) and/or other audio data captured via the one or more of the microphones 211.

As described herein, such audio data, vision data, and textual data (referred to collectively as corresponding client data) can be processed by the various on-device ML engines depicted in FIG. 2 to make predictions at the client device 210 using deployed on-device ML models. As some non-limiting example, the hotword detection engine 222 can utilize a hotword detection model 222A to predict whether audio data includes one or more particular words or phrases to invoke the automated assistant 295 (e.g., "Ok Google", "Hey Google", "What is the weather Google?", etc.) or certain functions of the automated assistant 295; the hotword free invocation engine 224 can utilize a hotword free invocation model 224A to predict whether vision data includes a gesture or signal to invoke the automated assistant 295 (e.g., based on a gaze of the user and optionally further based on mouth movement of the user); the continued conversation engine 226 can utilize a continued conversation model 226A to predict whether further audio data is directed to the automated assistant 295 (e.g., or directed to an additional user in the environment of the client device 210); the ASR engine 228 can utilize an ASR model 228A to generate recognized text, or predict phoneme(s) and/or token(s) that correspond to audio data detected at the client device 210 and generate the recognized text based on the phoneme(s) and/or token(s); the LLM engine 230 can utilize a LLM 230A to generate an LLM response, that includes textual content, multimedia content, and/or other content that is responsive to natural language input received at the client device and generate the LLM response based on a probability distribution over a sequence of token(s), such as word token(s), multimedia content token(s), and/or other token(s); the object analysis engine 232 can utilize an object analysis model 232A (e.g., an object detection model, an object classification model, and/or other object analysis model(s)) to predict object location(s) included in vision data of an image or video captured at the client device 210, object classification(s) of object(s) included in vision data of an image or video captured at the client device 210, and/or other information with respect to object(s) captured in vision data of an image or video; the voice identification engine 234 can utilize a voice identification model 234 to predict whether audio data captures a spoken utterance of one or more users of the client device 210 (e.g., by generating a speaker embedding, or other representation, that can be compared to a corresponding actual embeddings for one or more of the user of the client device 210); and the face identification engine 236 can utilize a face identification model to predict whether vision data of an image or video captures one or more of the users in an environment of the client device 210 (e.g., by generating an image embedding, or other representation, that can be compared to a corresponding image embeddings for one or more of the user of the client device 210).

In some implementations, the client device 210 may further include natural language understanding (NLU) engine 238 and fulfillment engine 240. The NLU engine 238 may perform on-device natural language understanding, utilizing NLU model 238A, on recognized text, predicted phoneme(s), and/or predicted token(s) generated by the ASR engine 228 to generate NLU data. The NLU data can include, for example, intent(s) that correspond to the spoken utterance and optionally slot value(s) for parameter(s) for the intent(s). Further, the fulfillment engine 240 can generate fulfillment data utilizing an on-device fulfillment model or on-device fulfillment rules 240A, and based on processing the NLU data. This fulfillment data can define local and/or remote responses (e.g., answers) to spoken utterances provided by a user of the client device 210, interaction(s) to perform with locally installed application(s) based on the spoken utterances, command(s) to transmit to Internet-of-things (IoT) device(s) (directly or via corresponding remote system(s)) based on the spoken utterance, and/or other resolution action(s) to perform based on the spoken utterance. The fulfillment data is then provided for local and/or remote performance/execution of the determined action(s) to resolve the spoken utterance. Execution can include, for example, rendering local and/or remote responses (e.g., visually and/or audibly rendering (optionally utilizing an on-device TTS module)), interacting with locally installed applications, transmitting command(s) to IoT device(s), and/or other action(s). In other implementations, the NLU engine 234 and the fulfillment engine 240 may be omitted, and the ASR engine 228 can generate the fulfillment data directly based on the audio data. For example, assume the ASR engine 228 processes, using the ASR model 228A, a spoken utterance of "turn on the lights." In this example, the ASR engine 228 can generate a semantic output that is then transmitted to a software application associated with the lights and/or directly to the lights that indicates that they should be turned on.

Notably, the cloud-based automated assistant component(s) 270 include cloud-based counterparts to the on-device engines and on-device models described herein with respect to FIG. 2. As some non-limiting example, the hotword detection engine 272 can utilize a hotword detection model 272A that is a cloud-based counterpart of the hotword detection engine 222 and the hotword detection model 222A; the hotword free invocation engine 274 can utilize a hotword free invocation model 274A that is a cloud-based counterpart of the hotword free invocation engine 276 and the hotword free invocation model 224A; the continued conversation engine 274 can utilize a continued conversation model 276A that is a cloud-based counterpart of the continued conversation engine 226 and the continued conversation model 226A; the ASR engine 278 can utilize an ASR model 278A that is a cloud-based counterpart of the ASR engine 228 and the ASR model 228A; the LLM engine 280 can utilize a LLM 280A that is a cloud-based counterpart of the LLM engine 230 and the LLM 230A; the object analysis engine 282 can utilize an object analysis model 282A that is a cloud-based counterpart of the object analysis engine 232 and the object analysis model 232A; the voice identification engine 284 can utilize a voice identification model 284A that is a cloud-based counterpart of the voice identification engine 234 and the voice identification model 234A; the face identification engine 286 can utilize a face identification model 286A that is a cloud-based counterpart of the face identification engine 236 and the face identification model 236A; the NLU engine 288 can utilize a NLU model 288A that is a cloud-based counterpart of the NLU engine 238 and the NLU model 238A; and the fulfillment engine 290 can utilize a fulfillment 290A that is a cloud-based counterpart of the fulfillment engine 240 and the fulfillment model 290A.

However, in various implementations, these engines and models may not be invoked since the engines and models may be transmitted directly to the client device 210 and executed locally at the client device 210 as described above with respect to FIG. 1. Nonetheless, a remote execution module can also optionally be included that performs remote execution based on local or remotely generated NLU data and/or fulfillment data. Additional and/or alternative remote engines can be included. As described herein, in various implementations on-device speech processing, on-device image processing, on-device NLU, on-device fulfillment, and/or on-device execution can be prioritized at least due to the latency and/or network usage reductions they provide when resolving a spoken utterance (due to no client-server roundtrip(s) being needed to resolve the spoken utterance). However, one or more cloud-based automated assistant component(s) 270 can be utilized at least selectively. For example, such component(s) can be utilized in parallel with on-device component(s) and output from such component(s) utilized when local component(s) fail. For example, if any of the on-device engines and/or models fail (e.g., due to relatively limited resources of the client device 210), then the more robust resources of the cloud may be utilized.

Turning now to FIG. 3, a flowchart illustrating an example method 300 of server-side functionality for updating large global machine learning (ML) model(s) is depicted. For convenience, the operations of the method 300 are described with reference to a system that performs the operations. The system of method 300 includes one or more processors and/or other component(s) of a remote system (e.g., the remote system 160 of FIG. 1, computing device 810 of FIG. 8, and/or other server-based computing devices). Moreover, while operations of the method 300 are shown in a particular order, this is not meant to be limiting. One or more operations may be reordered, omitted, or added.

At block 352, the system identifies a global machine learning (ML) model that is accessible at a remote system. For example, the system can identify the global ML model in the same or similar manner described with respect to the ML model identification engine 162 of FIG. 1.

At block 354, the system selects a plurality of client devices to participate in a given round of decentralized learning of the global ML model. For example, and as indicated at sub-block 354A, the system transmits, to a given client device, a corresponding request for whether the given client device has received corresponding feedback with respect to processing corresponding client device data using a corresponding on-device ML model that is an on-device version of the global ML model. Further, and as indicated at block 354B, the system receives, from the given client device, a corresponding response that is responsive to the corresponding request. Notably, the system can select the plurality of client devices to participate in the given round of decentralized learning of the global ML model in the same or similar manner described with respect to the client device selection engine 166 of FIG. 1.

At block 356, the system transmits, to each of the plurality of client devices, a processed version of the global ML model. For example, the system can generate and transmit the processed version of the global ML model to each of the plurality of client devices in the same or similar manner described with respect to the global ML model processing engine 164 and the remote training engine 168 of FIG. 1. In some implementations, and as indicated at sub-block 356A, the system transmits, to each of the plurality of client devices, an indication of one or more weighted client aggregation (WCA) techniques. For example, the system can transmit the indication of the one or more WCA techniques in the same or similar manner described with respect to the WCA engine 170 of FIG. 1.

At block 358, the system receives, from each of the plurality of client devices, a corresponding update for the global ML model. For example, and as indicated at sub-block 358A, each of the plurality of client devices generate the corresponding updates using partial model training and one or more of the WCA techniques. Each of the plurality of client devices can generate the corresponding update for the global ML model in the same or similar manner described with respect to the update engine 130 and the on-device ML training engine 132 of FIG. 1.

At block 360, the system updates, based on the corresponding updates for the global ML model, the global ML model. For example, the system can update the global ML model based on the corresponding updates for the global ML model in the same or similar manner described with respect to the remote training engine 168 of FIG. 1.

At block 362, the system determines whether one or more conditions are satisfied. The one or more conditions can include whether performance of the updated global ML model satisfies a performance threshold, whether a threshold quantity of corresponding updates have been in generating the updated global ML model, whether a threshold quantity of rounds of decentralized learning have been performed, and/or other conditions. If, at an iteration of block 362, the system determines that the one or more conditions are not satisfied, then the system returns to block 354 to select a plurality of additional client devices for a given additional round of decentralized learning of the global ML model and continues with another iteration of the method 300.

If, at an iteration of block 362, the system determines that the one or more conditions are satisfied, then the system proceeds to block 364. At block 364, the system causes the global ML model to be deployed. For example, the system can cause the global ML model to be deployed in the same or similar manner described with respect to the ML model distribution engine 172 of FIG. 1.

Turning now to FIG. 4, a flowchart illustrating an example method 400 of client-side functionality for updating large automatic speech recognition (ASR) model(s) is depicted. For convenience, the operations of the method 400 are described with reference to a system that performs the operations. The system of method 400 includes one or more processors and/or other component(s) of a client device (e.g., the client device 110 of FIG. 1, the client device 210 of FIG. 1, client device 610 of FIGS. 6A and/or 6B, client device 710 of FIGS. 7A and/or 7B computing device 810 of FIG. 8, and/or other client-based computing devices). Moreover, while operations of the method 400 are shown in a particular order, this is not meant to be limiting. One or more operations may be reordered, omitted, or added.

At block 452, the system receives, from a remote system, a processed version of a global machine learning (ML) model. For example, the system can receive the processed version of the global ML model during a given round of decentralized learning of the global ML model and from the remote training engine 168 of FIG. 1.

At block 454, the system obtains corresponding client data. For example, and as indicated at sub-block 454A, the system obtains, from a superset of corresponding client data that is associated with corresponding feedback that indicates a corresponding user of a client device has corrected prior output generated using a corresponding on-device version of the global ML model. In this manner, the system can ensure that the processed version of the global ML model only processes "good" client data that does, in fact, have required the correction to the prior output.

At block 456, the system processes, using the processed version of the global ML model, an instance of the corresponding client data to generate corresponding predicted output. For example, the system can process the instance of the corresponding client data to generate training predicted output as the corresponding predicted output in the same or similar manner described with respect to the on-device training engine 132 of FIG. 1.

At block 458, the system determines, based on the corresponding predicted output and corresponding feedback that was previously received with respect to the previous processing of the instance of the corresponding client data and using the corresponding on-device ML model, a corresponding loss for the processed version of the global ML model. For example, the system can determine the loss in the same or similar manner described with respect to the on-device training engine 132 of FIG. 1.

At block 460, the system generates, based on the corresponding loss for the processed version of the global ML model and while freezing one or more portions of the processed version of the global ML model at the client device (where different portions of the processed version of the global ML model can be freezed at different client devices that are participating in the given round of decentralized learning of the global ML model), a corresponding update for the global ML model. In some implementations, and as indicated at sub-block 460A, the system generates the corresponding update for the global ML model using one or more weighted client aggregation (WCA) techniques indicated by the remote system. For example, the system can generate the corresponding update in the same or similar manner described with respect to the update engine 130 of FIG. 1.

At block 462, the system determines whether there is an additional instance of the corresponding client data. If, at an iteration of block 462, the system determines that there is an additional instance of the corresponding client data, then the system returns to block 456 to process the additional instance of the corresponding client data and continues with another iteration of the method 400. If, at an iteration of block 462, the system determines that there is not an additional instance of the corresponding client data, then the system proceeds to block 464.

At block 464, the system transmits, to the remote system, the corresponding update for the global ML model. For example, the system can transmit the corresponding update for the global ML model in the same or similar manner described with respect to the update engine 130 of FIG. 1. This enables the remote system to update the global ML model based on the corresponding update (and additional corresponding updates received from additional client devices that are also participating in the given round of decentralized learning of the global ML model).

Turning now to FIG. 5, a flowchart illustrating an example method 500 of client-side functionality for updating large language model(s) (LLM(s)) is depicted. For convenience, the operations of the method 500 are described with reference to a system that performs the operations. The system of method 500 includes one or more processors and/or other component(s) of a client device (e.g., the client device 110 of FIG. 1, the client device 210 of FIG. 1, client device 610 of FIGS. 6A and/or 6B, client device 710 of FIGS. 7A and/or 7B computing device 810 of FIG. 8, and/or other client-based computing devices). Moreover, while operations of the method 500 are shown in a particular order, this is not meant to be limiting. One or more operations may be reordered, omitted, or added.

At block 552, the system receives, from a remote system, a processed version of a global machine learning (ML) model. For example, the system can receive the processed version of the global ML model during a given round of decentralized learning of the global ML model and from the remote training engine 168 of FIG. 1.

At block 554, the system obtains corresponding client data. For example, and as indicated at sub-block 554A, the system obtains, from a superset of corresponding client data that is associated with corresponding feedback that indicates a corresponding user of a client device has corrected prior output generated using a corresponding on-device version of the global ML model. In this manner, the system can ensure that the processed version of the global ML model only processes "good" client data that does, in fact, have required the correction to the prior output.

At block 556, the system processes, using the processed version of the global ML model, an instance of the corresponding client data to generate corresponding predicted output. For example, the system can process the instance of the corresponding client data to generate training predicted output as the corresponding predicted output in the same or similar manner described with respect to the on-device training engine 132 of FIG. 1.

At block 558, the system fine-tunes, based on the predicted output and while freezing one or more portions of the processed version of the global ML model (where different portions of the processed version of the global ML model can be freezed at different client devices that are participating in the given round of decentralized learning of the global ML model), the processed version of the global ML model to generate a corresponding fine-tuned processed version of the global ML model. In some implementations, and as indicated at block 558A, the system fine-tunes the processed version of the global ML model using one or more weighted client aggregation (WCA) techniques indicated by the remote system. Notably, the system may fine-tune the processed version of the global ML model in the same or similar manner described with respect to the update engine 130 and the on-device training engine 132 of FIG. 1. However, in contrast with the update 130A (e.g., including the gradient(s) $G_i$ and/or the weight(s) $w_i$ for the gradient(s) $G_i$), the update 130A corresponds to the actual corresponding fine-tuned processed version of the global ML model.

At block 560, the system determines whether there is an additional instance of the corresponding client data. If, at an iteration of block 560, the system determines that there is an additional instance of the corresponding client data, then the system returns to block 556 to process the additional instance of the corresponding client data and continues with another iteration of the method 500. If, at an iteration of block 560, the system determines that there is not an additional instance of the corresponding client data, then the system proceeds to block 562.

At block 562, the system transmits, to the remote system, the corresponding fine-tuned processed version of the global ML model. This enables the remote system to update the global ML model based on the corresponding fine-tuned processed version of the global ML model (and additional corresponding updates received from additional client devices that are also participating in the given round of decentralized learning of the global ML model).

Figure 6A:
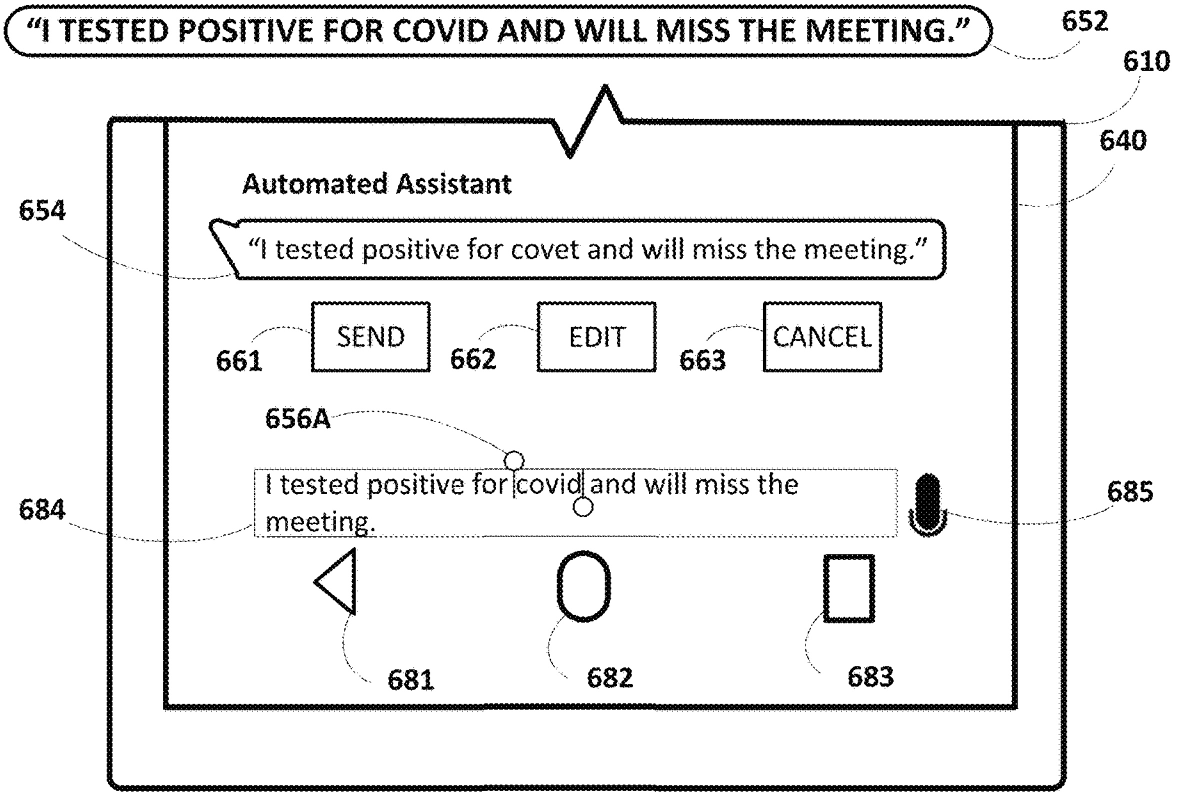
FIG. 6A and FIG. 6B depict various user interfaces illustrating example user interactions with a client device that is utilizing an on-device automatic speech recognition (ASR) model, in accordance with various implementations.
Figure 6B:
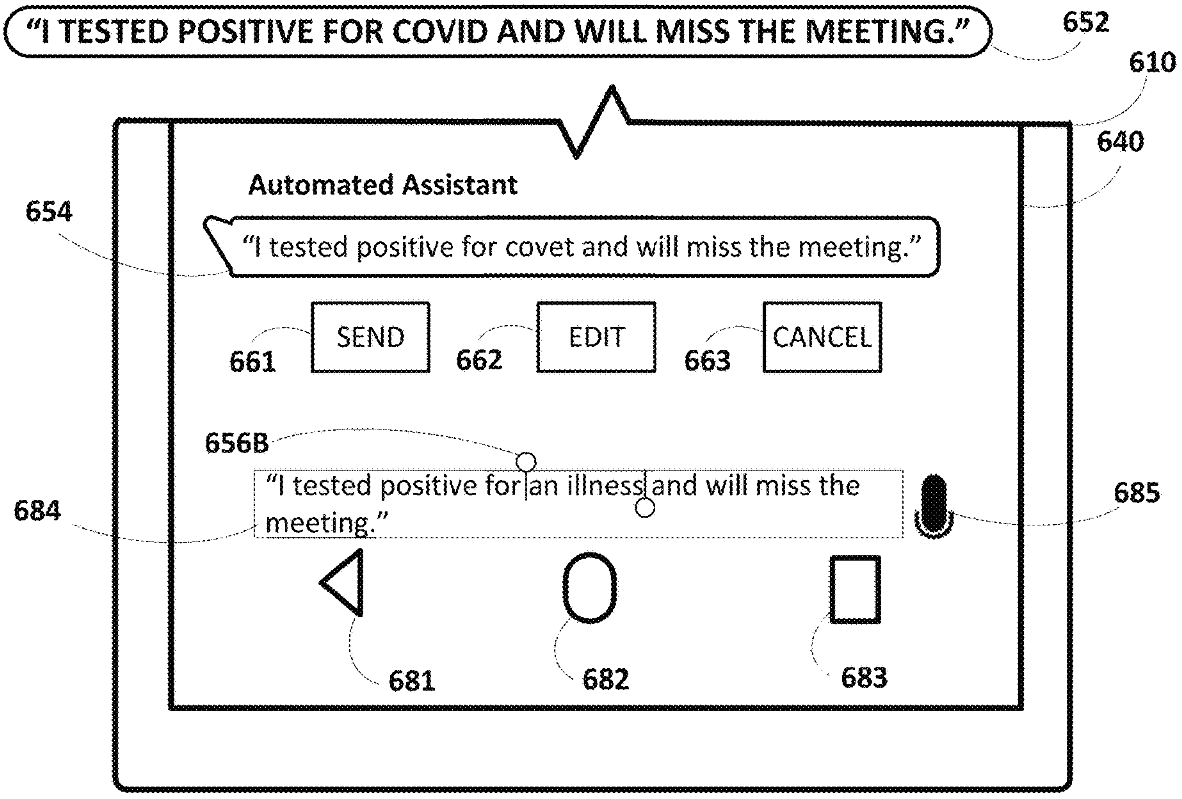

Turning now to FIGS. 6A and 6B, various user interfaces illustrating example user interactions with a client device 610 (e.g., an instance of the client device 110 from FIG. 1 and/or an instance of the client device 210 from FIG. 2) that is utilizing an on-device automatic speech recognition (ASR) model are depicted. The client device 610 of FIGS. 6A and 6B includes a touch-sensitive display screen 640 that displays and/or streams (i.e., in real-time) predicted textual segments corresponding to spoken utterances provided by a user of the client device 610 according to implementations disclosed herein. For convenience, operations performed by the client device 610 are described with reference to an automated assistant (e.g., the automated assistant 295 of FIG. 2) that performs the operations.

The display screen 640 includes a textual reply and/or editing element 684 that allows a user to provide user input (e.g., touch input or typed input) for generating, modifying, deleting, and/or replacing term(s) via a virtual keyboard. Further, the display screen 640 also includes a voice interface element 685 that, when activated, allows the user to provide user input (e.g., spoken input) for affirming an action being performed by the client device 610, canceling an action being performed by the client device 610, and/or providing a spoken utterance that is captured in audio data generated via one or more microphones of the client device 610. Moreover, a predicted textual segment can be generated and visually rendered on the display screen 640 of the client device 610, and user input correcting the predicted textual segment to an alternate textual segment can be touch input directed to the predicted textual segment(s) included in the textual reply and/or editing element 684 of the display screen 640 of the client device 610. In additional and/or alternative implementations, the user input correcting the predicted textual segment to the alternate textual segment can be an additional spoken utterance. In some versions of these implementations, the additional spoken utterance is received in response touch input directed to the voice interface element 685, the additional spoken utterance is received within a threshold amount of time of the user input while the one or more microphones are activated without any touch input directed to the voice interface element 685, and/or other spoken input activation methods. Moreover, in some implementations, the display screen 640 also includes system interface elements 681, 682, 683 that may be interacted with by the user to cause the computing device 610 to perform one or more actions.

In various implementations, a spoken utterance may include an action to be performed by the automated assistant using the client device 610. As some non-limiting examples, the action may be an action of calling or dialing a phone number, sending a text or SMS message (e.g., as shown in FIGS. 6A and 6B), sending an email, looking up contact information, requesting navigational information, sending a calendar invitation, controlling one or more IoT devices, and/or other actions capable of being performed by the automated assistant operating on the client device 610.

Referring specifically to FIG. 6A, assume that a user of the client device 610 provides a spoken utterance 652 of "I tested positive for covid and will miss the meeting tomorrow", and an automated assistant visually renders a predicted textual segment 654 of "I tested positive for covet and will miss the meeting tomorrow" (e.g., generated using a corresponding on-device ASR model). Notably, the predicted textual segment 654 includes an ASR misrecognition—"covet" instead of "covid" as the user intended. Accordingly, assume that the user directs further user interface input, such as touch input, to the client device 610 that modifies a portion of the predicted textual segment 654 (e.g., "covet") to an alternate textual segment (e.g., "covid") as indicated by 656A, thereby resulting in "I tested positive for covid and will miss the meeting tomorrow" as the user intended. In this example, the automated assistant may generate candidate correction data that includes the pair [covet, covid] based on the further user interface input that modifies the portion of the predicted textual segment 654 (e.g., "covet") to the alternate textual segment (e.g., "covid") as indicated by 656A. Further, the automated assistant may cause the candidate correction data to be stored in on-device memory of the client device 610 and in association with audio data that captures the spoken utterance 652. Moreover, the automated assistant, and in response to receiving a corresponding request from a remote system (e.g., the remote system 160 of FIG. 1), can generate a corresponding response that indicates the client device 610 has received corresponding feedback with respect to performance of the on-device ASR model based on the correction data.

In some implementations, the textual reply and/or editing element 684 can be automatically populated with the predicted textual segment 654 of "I tested positive for covet and will miss the meeting tomorrow" for editing by the user, and the user input can be directed to the textual reply and/or editing element 684 to, for example, modify "covet" to "covid" as also indicated by 656A (e.g., cursor identifiers). In additional or alternative implementations, the automated assistant can visually render a send selectable graphical element 661, an edit selectable graphical element 662, and/or a cancel selectable graphical element 663. In some versions of those implementations, to populate the textual reply and/or editing element 684 with the predicted textual segment 654 of "I tested positive for covet and will miss the meeting tomorrow" for editing by the user, some user input can be directed to the edit selectable graphical element 662, thereby populating the textual reply and/or editing element 684.

Notably, the modification of the portion of the predicted textual segment 654 from "covet" to "covid" may only be utilized in generating a corresponding update for the global ASR model in response to determining that the modification is, in fact, a correction that is directed to performance of the on-device ASR model of the client device 610. In some implementations, determining that the modification is a correction directed to performance of the on-device ASR model may be based on, for example, determining a word length difference between the ASR misrecognition generated by the on-device ASR model and an ASR correction that was provided by the user is within a threshold word length distance (e.g., using Levenshtein edit distance). In the example of FIG. 6A, the word length difference is two letters (e.g., "id" in "covid" vs. "et" in "covet"), and may be sufficient to satisfy the threshold word length difference. In additional or alternative implementations, determining that the modification is a correction directed to performance of the on-device ASR model may be based on, for example, determining a semantic difference between the ASR misrecognition generated by the on-device ASR model and an ASR correction that was provided by the user satisfies a semantic difference threshold. In the example of FIG. 6A, there is a vast semantic difference between "covet" and "covid", and may satisfy the semantic difference threshold. In additional or alternative implementations, determining that the modification is a correction directed to performance of the on-device ASR model may be based on, for example, determining an acoustic similarity between the ASR misrecognition generated by the on-device ASR model and an ASR correction that was provided by the user satisfies an acoustic similarity threshold. In the example of FIG. 6A, "covet" and "covid" are acoustically similar, and may satisfy the acoustic similarity threshold.

In contrast, and referring specifically to FIG. 6B, assume that instead the user had directed further user interface input, such as touch input, to the client device 610 that modifies a portion of the predicted textual segment 654 (e.g., "covet") to an alternate textual segment (e.g., "an illness") as indicated by 656B, thereby resulting in "I tested positive for an illness and will miss the meeting tomorrow". Notably, in this example, the user of the client device 610 has simply changed their mind with respect to the spoken utterance 652 (e.g., by changing "covet" to "an illness") despite the ASR misrecognition. Nonetheless, the automated assistant may generate correction data that includes [covet, an illness] based on the further user interface input that modifies the portion of the predicted textual segment 654 (e.g., "covet") to the alternate textual segment (e.g., "an illness") as indicated by 656B. Further, the automated assistant may cause the candidate correction data to be stored in on-device memory of the client device 610 and optionally in association with audio data that captures the spoken utterance 652. However, in this example, it is unlikely that it would be determined that the candidate correction data corresponds to an actual correction based on, for example, a word difference between "covet" and "an illness", a semantic difference between "covet" and "an illness", and/or acoustic similarity between "covet" and "an illness".

Although FIGS. 6A and 6B depict particular examples, it should be understood that these examples are provided for illustrative purposes and are not meant to be limiting. Rather, it should be understood that FIGS. 6A and 6B are provided to illustrate various user interactions in which candidate correction data may be generated locally at the client device 610 and based on usage of the on-device ASR model.

Figure 7A:
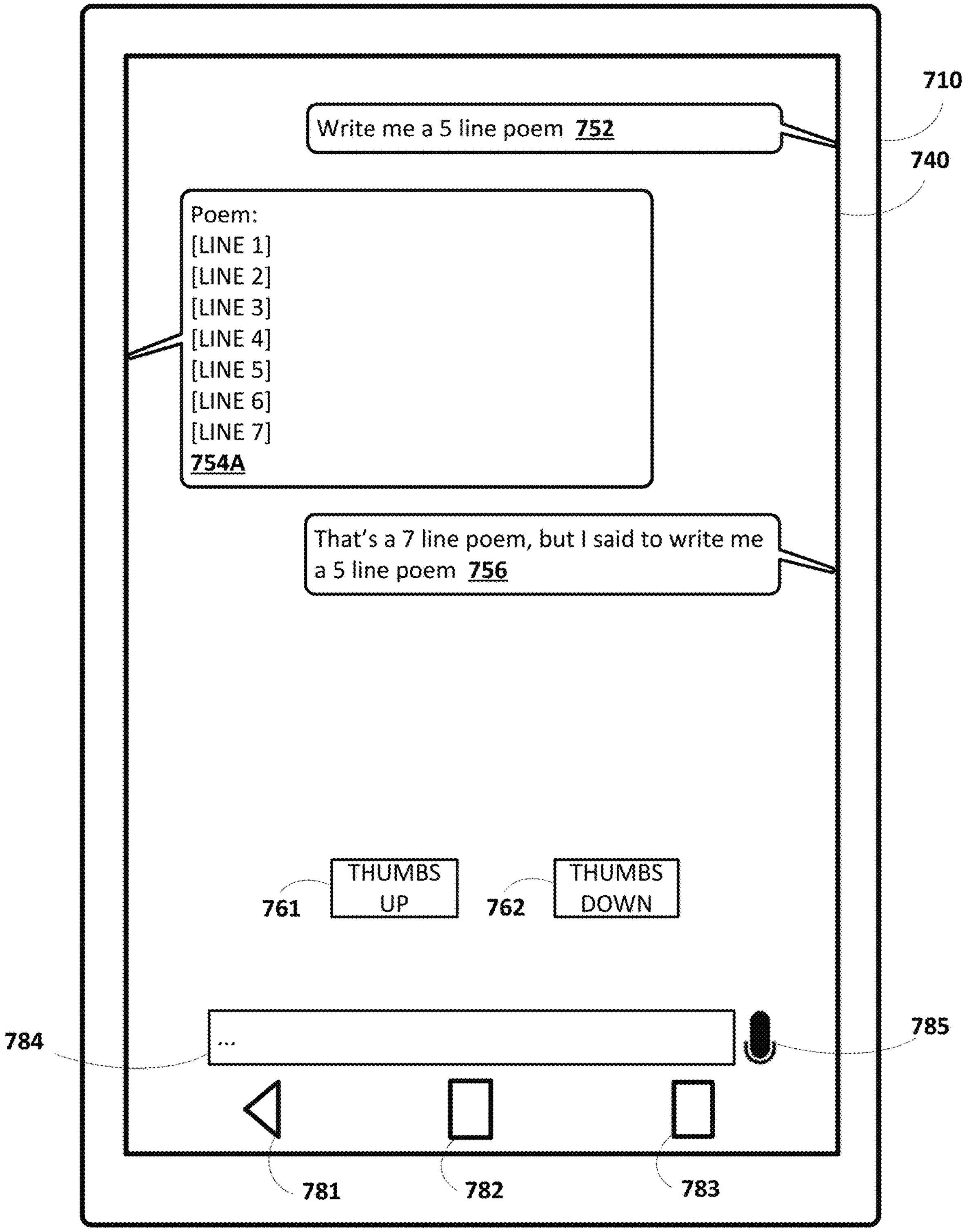
FIG. 7A and FIG. 7B depicts various user interfaces illustrating example user interactions with a client device that is utilizing an on-device large language model (LLM), in accordance with various implementations.
Figure 7B:
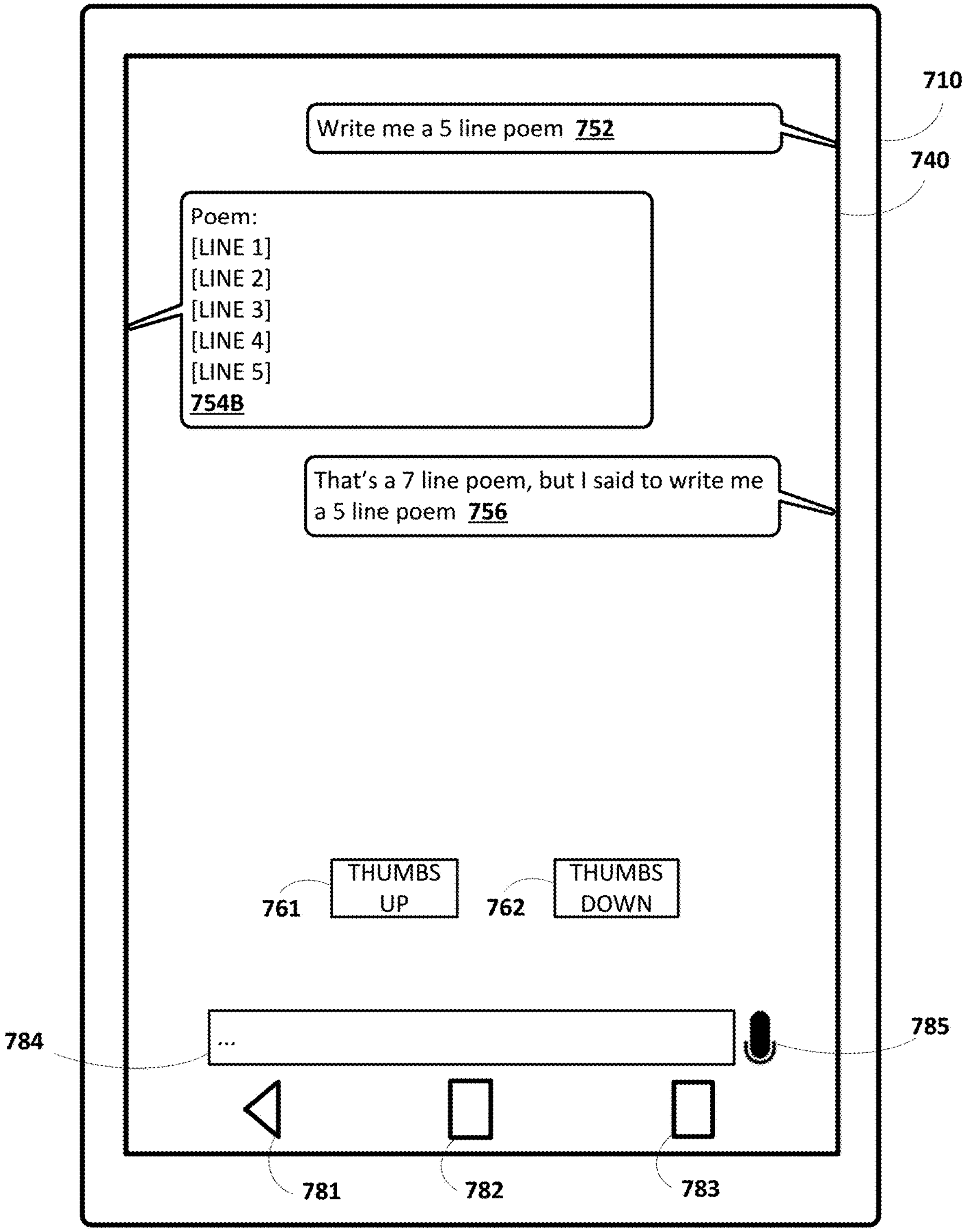

Turning now to FIGS. 7A and 7B, various user interfaces illustrating example user interactions with a client device 710 (e.g., an instance of the client device 110 from FIG. 1 and/or an instance of the client device 210 from FIG. 2) that is utilizing an on-device large language model (LLM) are depicted. The client device 710 of FIGS. 7A and 7B includes a touch-sensitive display screen 740 that displays and/or streams (i.e., in real-time) LLM responses that are responsive to natural language inputs provided by a user of the client device 710 according to implementations disclosed herein.

The display screen 740 includes a textual reply and/or editing element 784 that allows a user to provide user input (e.g., touch input or typed input) for generating, modifying, deleting, and/or replacing term(s) via a virtual keyboard. Further, the display screen 740 also includes a voice interface element 785 that, when activated, allows the user to provide user input (e.g., spoken input) for affirming an action being performed by the client device 710, canceling an action being performed by the client device 710, and/or providing a spoken utterance that is captured in audio data generated via one or more microphones of the client device 710. Moreover, an LLM response that is responsive to natural language input can be generated and visually rendered on the display screen 740 of the client device 710, and additional natural language input that provides feedback with respect to the LLM response can be provided. In additional or alternative implementations, the user can provide some binary feedback (e.g., by selecting a "thumbs up" graphical user interface element 761 that indicates the LLM response is sufficient or by selecting a "thumbs down" graphical user interface element 762 that indicates the LLM response is insufficient). Moreover, in some implementations, the display screen 740 also includes system interface elements 781, 782, 783 that may be interacted with by the user to cause the computing device 710 to perform one or more actions.

In various implementations, a natural language input directed to the on-device LLM may include an action to be performed by an automated assistant using the client device 710, a prompt for information, a query for information, and/or include other content (e.g., image content, video content, etc. that can optionally be transformed into natural language using, for example, captioning model(s), object analysis model(s), etc.). Referring specifically to FIG. 7A, assume that a user of the client device 710 provides natural language input 752 of "write me a 5 line poem", and the on-device LLM processes the natural language input 752 and generates an LLM response 754A. Notably, the LLM response 754A includes a poem that is 7 lines instead of 5 lines as the user requested. Accordingly, assume that the user provides additional natural language input 756 of "That's a 7 line poem, but I said to write me a 5 line poem". In this example, the client device 710 (or an automated assistant executing at the client device (e.g., an instance of the automated assistant 295 from FIG. 2)) may generate a corresponding candidate correction that includes the natural language input 752, the LLM response 754A, and the additional natural language input 756 (and optionally any audio data if the natural language inputs correspond to spoken utterances). Further, the client device 710 may cause the candidate correction to be stored in on-device memory of the client device 710. Moreover, the automated assistant, and in response to receiving a corresponding request from a remote system (e.g., the remote system 160 of FIG. 1), can generate a corresponding response that indicates the client device 710 has received corresponding feedback with respect to performance of the on-device LLM based on the candidate correction.

Notably, the feedback that the on-device LLM failed to follow an explicit instruction included in the natural language input 752 may only be utilized in generating a corresponding update for the global LLM in response to determining that the on-device LLM did, in fact, fail to follow the explicit instruction included in the LLM response 754A. In some implementations, determining that the additional natural language input 756 is a correction to the LLM response 754A is a correction directed to performance of the on-device LLM may be based on, for example, determining whether the additional natural language input 756 is accurate. For example, the on-device LLM can process the LLM response 754A that was generated responsive to the natural language input 752 and the additional natural language input 756 to determine whether the poem that was generated does, in fact, include 7 lines. In response to the on-device LLM determining that the poem that was generated does, in fact, include 7 lines, the feedback can be utilized to determine that the candidate correction data includes an actual correction.

In contrast, and referring specifically to FIG. 7B, assume that the on-device LLM processes the natural language input 752 and generates an LLM response 754B. Notably, the LLM response 754N includes a poem that is 5 as the user requested. However, further assume that the user provides the additional natural language input 756 of "That's a 7 line poem, but I said to write me a 5 line poem". In this example, the client device 710 (or an automated assistant executing at the client device (e.g., an instance of the automated assistant 295 from FIG. 2)) may generate a corresponding candidate correction that includes the natural language input 752, the LLM response 754B, and the additional natural language input 756 (and optionally any audio data if the natural language inputs correspond to spoken utterances). Further, the client device 710 may cause the candidate correction to be stored in on-device memory of the client device 710. Moreover, the automated assistant, and in response to receiving a corresponding request from a remote system (e.g., the remote system 160 of FIG. 1), can generate a corresponding response that indicates the client device 710 has received corresponding feedback with respect to performance of the on-device LLM based on the candidate correction. However, in this example, the on-device LLM can determine that the additional natural language input 756 is not a correction. Rather, in the example of FIG. 7B, the user may simply be trying to trick the on-device LLM and/or test the on-device LLM.

Although FIGS. 7A and 7B depict particular examples, it should be understood that these examples are provided for illustrative purposes and are not meant to be limiting. Rather, it should be understood that FIGS. 7A and 7B are provided to illustrate various user interactions in which candidate correction data may be generated locally at the client device 710 and based on usage of an on-device LLM. Further, although the example of FIGS. 7A and 7B are described with respect to an explicit instruction being violated by the on-device LLM, it should be understood that is for the sake of example and is not meant to be limiting. For instance, the on-device LLM can additionally, or alternatively, fail to follow implicit writing principles that should be utilized in generating the LLM response, fail to provide a desired level of specificity, include factually inaccurate information, and/or include other shortcomings. Moreover, although the examples of FIGS. 7A and 7B are described with respect to the feedback being natural language feedback, it should be understood that is for the sake of example and is not meant to be limiting. For instance, the "thumbs down" graphical user interface element 762 that indicates the LLM response is insufficient can additionally, or alternatively, be utilized as a feedback signal.

Figure 8:
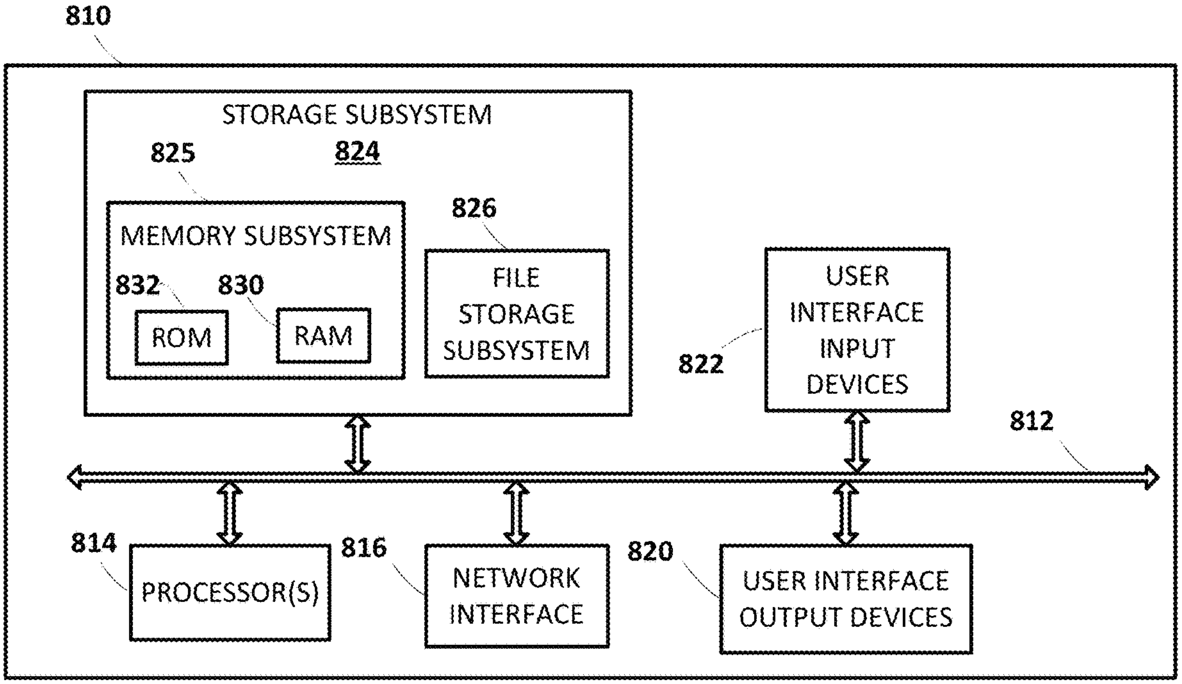
FIG. 8 depicts an example architecture of a computing device, in accordance with various implementations.

Turning now to FIG. 8, a block diagram of an example computing device 810 that may optionally be utilized to perform one or more aspects of techniques described herein is depicted. In some implementations, one or more of a client device, cloud-based automated assistant component(s), and/or other component(s) may comprise one or more components of the example computing device 810.

Computing device 810 typically includes at least one processor 814 which communicates with a number of peripheral devices via bus subsystem 812. These peripheral devices may include a storage subsystem 824, including, for example, a memory subsystem 825 and a file storage subsystem 826, user interface output devices 820, user interface input devices 822, and a network interface subsystem 816. The input and output devices allow user interaction with computing device 810. Network interface subsystem 816 provides an interface to outside networks and is coupled to corresponding interface devices in other computing devices.

User interface input devices 822 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 810 or onto a communication network.

User interface output devices 820 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 810 to the user or to another machine or computing device.

Storage subsystem 824 stores programming and data constructs that provide the functionality of some or all of the modules described herein. For example, the storage subsystem 824 may include the logic to perform selected aspects of the methods disclosed herein, as well as to implement various components depicted in FIGS. 1A and 1B.

These software modules are generally executed by processor 814 alone or in combination with other processors. Memory 825 used in the storage subsystem 824 can include a number of memories including a main random access memory (RAM) 830 for storage of instructions and data during program execution and a read only memory (ROM) 832 in which fixed instructions are stored. A file storage subsystem 826 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 826 in the storage subsystem 824, or in other machines accessible by the processor(s) 814.

Bus subsystem 812 provides a mechanism for letting the various components and subsystems of computing device 810 communicate with each other as intended. Although bus subsystem 812 is shown schematically as a single bus, alternative implementations of the bus subsystem may use multiple busses.

Computing device 810 can be of varying types including a workstation, server, computing cluster, blade server, server farm, or any other data processing system or computing device. Due to the ever-changing nature of computers and networks, the description of computing device 810 depicted in FIG. 8 is intended only as a specific example for purposes of illustrating some implementations. Many other configurations of computing device 810 are possible having more or fewer components than the computing device depicted in FIG. 8.

In situations in which the systems described herein collect or otherwise monitor personal information about users, or may make use of personal and/or monitored information), the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

In some implementations, a method performed by one or more processors of a remote system is provided herein, and includes: identifying a global machine learning (ML) model that is accessible at the remote system, the global ML model having global weights; selecting a plurality of client devices to participate in a given round of decentralized learning of the global ML model, each of the plurality of client devices having previously processed corresponding client data using a corresponding on-device ML model that is an on-device version of the global ML model, and each of the plurality of client devices having received corresponding feedback with respect to the processing of the corresponding client data using the corresponding on-device ML model; and transmitting, to each of the plurality of client devices, a processed version of the global ML model, the processed version of the global ML model being of a reduced transferrable size compared to the global ML model. Transmitting the processed version of the global ML model to each of the plurality of client devices causes each of the plurality of client devices to: perform, based on the corresponding client data and the corresponding feedback received with respect to the processing of the corresponding client data using the corresponding on-device ML model, partial model training for the processed version of the global ML model to generate a corresponding update for the global ML model; and transmit, to the remote system, the corresponding update for the global ML model. The method further includes updating, based on the corresponding updates that are received from the plurality of client devices, the global ML model.

These and other implementations of the technology can include one or more of the following features.

In some implementations, the global ML model may be a global automatic speech recognition (ASR) model, and the corresponding on-device ML model may be a corresponding on-device ASR model.

In some versions of those implementations, selecting the plurality of client devices to participate in the given round of decentralized learning of the global ML model may include transmitting, to a given client device, a corresponding request for whether the given client device has received corresponding feedback with respect to the processing of the corresponding client data using the corresponding on-device ASR model; receiving, from the given client device, a corresponding response that is responsive to the corresponding request; and in response to determining that the corresponding response that is responsive to the corresponding request indicates that the given client device has received corresponding feedback with respect to the processing of the corresponding client data using the corresponding on-device ASR model: selecting the given client device for inclusion in the plurality of client devices to participate in the given round of decentralized learning of the global ML model. The corresponding feedback with respect to the processing of the corresponding client data using the corresponding on-device ASR model can indicate that a corresponding user of the given client device has corrected an ASR misrecognition generated by the on-device ASR model.

In some further versions of those implementations, the method may further include in response to determining that the corresponding response that is responsive to the corresponding request indicates that the given client device has not received corresponding feedback with respect to the processing of the corresponding client data using the corresponding on-device ASR model: refraining from selecting the given client device for inclusion in the plurality of client devices to participate in the given round of decentralized learning of the global ML model.

In some additional or alternative further versions of those implementations, the method may further include: continue transmitting, to a plurality of additional client devices, the corresponding request for whether the plurality of additional client devices have received corresponding feedback with respect to the processing of the corresponding client data using the corresponding on-device ASR model until a threshold quantity of client devices have been selected for inclusion in the plurality of client devices to participate in the given round of decentralized learning of the global ML model.

In some versions of those implementations, the method may further include, prior to transmitting the processed version of the global ML model to each of the plurality of client devices: generating the processed version of the global ML model.

In some further versions of those implementations, generating the processed version of the global ML model may include: quantizing the global ASR model to generate a quantized version of the global ML model as the processed version of the global ML model.

In some additional or alternative further versions of those implementations, generating the processed version of the global ML model may include: pruning one or more layers of the global ASR model and/or one or more of the global weights of the global ASR model to generate a pruned version of the global ASR model as the processed version of the global ML model.

In some versions of those implementations, updating the global ML model based on the corresponding updates that are received from the plurality of client devices may be based on a weighted client aggregation (WCA) technique.

In some further versions of those implementations, the WCA technique may include a frequency based weights technique, and the frequency based weights technique may cause each of the plurality of client devices to generate the corresponding update for the global ML model based on: (i) a corresponding frequency of misrecognized words by the corresponding on-device ASR models across the plurality of client devices.

In some additional or alternative further versions of those implementations, the WCA technique may include a frequency and accuracy based weights technique, and the frequency and accuracy based weights technique may cause each of the plurality of client devices to generate the corresponding update for the global ML model based on: (i) a corresponding frequency of misrecognized words by the corresponding on-device ASR models across the plurality of client devices, and (ii) a corresponding accuracy of the misrecognized words by the corresponding on-device ASR models across the plurality of client devices.

In some additional or alternative further versions of those implementations, the WCA technique may include a frequency, accuracy, and distribution based weights technique, and the frequency, accuracy, and distribution based weights technique may cause each of the plurality of client devices to generate the corresponding update for the global ML model based on: (i) a corresponding frequency of misrecognized words by the corresponding on-device ASR models across the plurality of client devices, (ii) a corresponding accuracy of the misrecognized words by the corresponding on-device ASR models across the plurality of client devices, and (iii) a corresponding distribution of corrected words for the misrecognized words by the corresponding on-device ASR models across the plurality of client devices.

In some implementations, the global ML model may be a global large language model (LLM), and the corresponding on-device ML model may be a corresponding on-device LLM.

In some versions of those implementations, selecting the plurality of client devices to participate in the given round of decentralized learning of the global ML model may include: transmitting, to a given client device, a corresponding request for whether the given client device has received corresponding feedback with respect to the processing of the corresponding client data using the corresponding on-device LLM; receiving, from the given client device, a corresponding response that is responsive to the corresponding request; and in response to determining that the corresponding response that is responsive to the corresponding request indicates that the given client device has received corresponding feedback with respect to the processing of the corresponding client data using the corresponding on-device LLM: selecting the given client device for inclusion in the plurality of client devices to participate in the given round of decentralized learning of the global ML model. The corresponding feedback with respect to the processing of the corresponding client data using the corresponding on-device LLM can indicate that a corresponding user of the given client device has corrected an LLM response generated by the on-device LLM.

In some further versions of those implementations, the method may further include in response to determining that the corresponding response that is responsive to the corresponding request indicates that the given client device has not received corresponding feedback with respect to the processing of the corresponding client data using the corresponding on-device LLM: refraining from selecting the given client device for inclusion in the plurality of client devices to participate in the given round of decentralized learning of the global ML model.

In some additional or alternative further versions of those implementations, the method may further include continue transmitting, to a plurality of additional client devices, the corresponding request for whether the plurality of additional client devices have received corresponding feedback with respect to the processing of the corresponding client data using the corresponding on-device LLM model until a threshold quantity of client devices have been selected for inclusion in the plurality of client devices to participate in the given round of decentralized learning of the global ML model.

In some versions of those implementations, the method may further include, prior to transmitting the processed version of the global ML model to each of the plurality of client devices: generating the processed version of the global ML model.

In some further versions of those implementations, generating the processed version of the global ML model may include: quantizing the global LLM to generate a quantized version of the global LLM as the processed version of the global ML model.

In some additional or alternative further versions of those implementations, generating the processed version of the global ML model may include: pruning one or more layers of the global LLM and/or one or more of the global weights of the global LLM to generate a pruned version of the global LLM as the processed version of the global ML model.

In some implementations, the method may further include, subsequent to updating the global ML model based on the corresponding updates that are received from the plurality of client devices: determining whether one or more conditions are satisfied; and in response to determining that the one or more conditions are satisfied: causing the global ML model to be deployed.

In some versions of those implementations, the method may further include, in response to determining that the one or more conditions are not satisfied: selecting a plurality of additional client devices to participate in a given additional round of decentralized learning of the global ML model.

In additional or alternative versions of those implementations, the one or more conditions may include one or more of: whether performance of the global ML model satisfies a performance threshold, whether a threshold quantity of corresponding updates have been utilized to update the global ML model, or whether a threshold quantity of rounds of decentralized learning of the global ML model have been performed.

In some implementations, a method performed by one or more processors of a client device is provided herein, and includes: receiving, from a remote system, a processed version of a global machine learning (ML) model, the processed version of the global ML model being of a reduced transferrable size compared to the global ML model; obtaining corresponding client data, the corresponding client data being previously processed, locally at the client device, using a corresponding on-device ML model that is an on-device version of the global ML model, and the corresponding client data having previously received corresponding feedback with respect to the previous processing of the corresponding client data using the corresponding on-device ML model; processing, using the processed version of the global ML model, the corresponding client data to generate corresponding predicted output; determining, based on the corresponding predicted output and the corresponding feedback that was previously received with respect to the previous processing of the corresponding client data and using the corresponding on-device ML model, a corresponding loss for the processed version of the global ML model; generating, based on the corresponding loss for the processed version of the global ML model and while freezing one or more portions of the processed version of the global ML model, a corresponding update for the global ML model; and transmitting, to the remote system, the corresponding update for the global ML model. Transmitting the corresponding update for the global ML model to the remote system causes the remote system to: update, based on the corresponding update for the global ML model received from the client device and based on additional corresponding updates for the global ML model received from a plurality of additional client devices, the global ML model.

These and other implementations of the technology can include one or more of the following features.

In some implementations, the global ML model may be a global automatic speech recognition (ASR) model, and the corresponding on-device ML model may be a corresponding on-device ASR model.

In some versions of those implementations, obtaining the corresponding client data may include obtaining, from a superset of corresponding client data, the corresponding client data that is associated with the corresponding feedback that indicates a corresponding user of the given client device has corrected an ASR misrecognition generated by the on-device ASR model.

In some further versions of those implementations, determining that the corresponding feedback that indicates that the corresponding user of the given client device has corrected the ASR misrecognition generated by the on-device ASR model may include determining a word length difference between the ASR misrecognition generated by the on-device ASR model and an ASR correction that was provided by the corresponding user; and determining, based on the word length difference being within a threshold word length distance, that the corresponding feedback that indicates that the corresponding user of the given client device has corrected the ASR misrecognition.

In some yet further versions of those implementations, the corresponding client data may be audio data, the corresponding predicted output may be a corresponding speech hypothesis that is predicted to correspond to a spoken utterance captured in the audio data, and determining the corresponding loss for the processed version of the global ML model based on the corresponding predicted output and the corresponding feedback that was previously received with respect to the previous processing of the corresponding client data and using the corresponding on-device ML model may include comparing the ASR correction to the ASR misrecognition; and determining, based on comparing the ASR correction to the ASR misrecognition, the corresponding loss for the processed version of the global ML model.

In additional or alternative versions of those implementations, determining that the corresponding feedback that indicates that the corresponding user of the given client device has corrected the ASR misrecognition generated by the on-device ASR model may include: determining a semantic difference between the ASR misrecognition generated by the on-device ASR model and an ASR correction that was provided by the corresponding user; and determining, based on the semantic difference, that the corresponding feedback that indicates that the corresponding user of the given client device has corrected the ASR misrecognition.

In additional or alternative implementations, generating the corresponding update for the global ML model based on the corresponding loss for the processed version of the global ML model and while freezing one or more portions of the processed version of the global ML model may include: freezing a subset of encoder layers, of a plurality of encoder layers, of the processed version of the global ML model; and backpropagating the corresponding loss across the processed version of the global ML model to generate the corresponding update for the global ML model.

In some further versions of those implementations, the processed version of the global ML model may be a quantized version of the global ML model, and generating the corresponding update for the global ML model based on the corresponding loss for the processed version of the global ML model and while freezing one or more portions of the processed version of the global ML model further may include prior to backpropagating the corresponding loss across the processed version of the global ML model to generate the corresponding update for the global ML model: dequantizing one or more weights of the quantized version of the global ML model.

In some implementations, a method performed by one or more processors of a client device is provided herein, and includes: receiving, from a remote system, a processed version of a global machine learning (ML) model, the processed version of the global ML model being of a reduced transferrable size compared to the global ML model; obtaining corresponding client data, the corresponding client data being previously processed, locally at the client device, using a corresponding on-device ML model that is an on-device version of the global ML model, and the corresponding client data having previously received corresponding feedback with respect to the previous processing of the corresponding client data using the corresponding on-device ML model; processing, using the processed version of the global ML model, the corresponding client data to generate corresponding predicted output; fine-tuning, based on the predicted output and while freezing one or more portions of the processed version of the global ML model, the processed version of the global ML model to generate a corresponding fine-tuned processed version of the global ML model; and transmitting, to the remote system, the corresponding fine-tuned processed version of the global ML model as a corresponding update for the global ML model. Transmitting the corresponding fine-tuned processed version of the global ML model to the remote system causes the remote system to: update, based on the corresponding fine-tuned processed version of the global ML model received from the client device and based on corresponding fine-tuned processed version of the global ML model received from a plurality of additional client devices, the global ML model.

These and other implementations of the technology can include one or more of the following features.

In some implementations, the global ML model may be a global large language model (LLM), and the corresponding on-device ML model may be a corresponding on-device LLM.

In some versions of those implementations, obtaining the corresponding client data may include: obtaining, from a superset of corresponding client data, the corresponding client data that is associated with the corresponding feedback that indicates a corresponding user of the given client device has corrected an LLM response generated by the on-device ASR model.

In some further versions of those implementations, determining that the corresponding feedback that indicates that the corresponding user of the given client device has corrected the LLM response generated by the on-device LLM may include: determining that the corresponding user of the client device has provided binary feedback that indicates the LLM response is insufficient.

In additional or alternative versions of those implementations, determining that the corresponding feedback that indicates that the corresponding user of the given client device has corrected the LLM response generated by the on-device LLM may include: determining that the corresponding user of the client device has provided natural language feedback that indicates the LLM response is insufficient.

In some further versions of those implementations, the corresponding client data may be natural language input that was directed to the corresponding on-device LLM, and processing the corresponding client data to generate the corresponding predicted output using the processed version of the global ML model may include: processing, using the processed version of the global ML model, the natural language input that was directed to the corresponding on-device LLM to generate a refined LLM response as the predicted output.

In some yet further versions of those implementations, fine-tuning the processed version of the global ML model to generate the corresponding fine-tuned processed version of the global ML model based on the predicted output and while freezing one or more of the portions of the processed version of the global ML model may include: freezing a subset of layers, of a plurality of layers, of the processed version of the global ML model; and fine-tuning, based on the refined LLM response, the processed version of the global ML model to generate the corresponding fine-tuned processed version of the global ML model.

In some even yet further versions of those implementations, the processed version of the global ML model may be a quantized version of the global LLM, and the method may further include, prior to fine-tuning the processed version of the global ML model to generate the corresponding fine-tuned processed version of the global ML model based on the refined LLM response: dequantizing one or more weights of the quantized version of the global LLM.

Various implementations can include a non-transitory computer readable storage medium storing instructions executable by one or more processors (e.g., central processing unit(s) (CPU(s)), graphics processing unit(s) (GPU(s)), digital signal processor(s) (DSP(s)), and/or tensor processing unit(s) (TPU(s)) to perform a method such as one or more of the methods described herein. Other implementations can include an automated assistant client device (e.g., a client device including at least an automated assistant interface for interfacing with cloud-based automated assistant component(s)) that includes processor(s) operable to execute stored instructions to perform a method, such as one or more of the methods described herein. Yet other implementations can include a system of one or more servers that include one or more processors operable to execute stored instructions to perform a method such as one or more of the methods described herein.

What is claimed is:

1. A method implemented by one or more processors of a remote system, the method comprising:

identifying a global machine learning (ML) model that is accessible at the remote system, the global ML model having global weights;

selecting a plurality of client devices to participate in a given round of decentralized learning of the global ML model, each of the plurality of client devices having previously processed corresponding client data using a corresponding on-device ML model that is an on-device version of the global ML model, and each of the plurality of client devices having received corresponding feedback with respect to the processing of the corresponding client data using the corresponding on-device ML model;

transmitting, to each of the plurality of client devices, a processed version of the global ML model, the processed version of the global ML model being of a reduced transferrable size compared to the global ML model, wherein transmitting the processed version of the global ML model to each of the plurality of client devices causes each of the plurality of client devices to:

perform, based on the corresponding client data and the corresponding feedback received with respect to the processing of the corresponding client data using the corresponding on-device ML model, partial model training for the processed version of the global ML model to generate a corresponding update for the global ML model; and transmit, to the remote system, the corresponding update for the global ML model; and updating, based on corresponding updates that are received from the plurality of client devices, the global ML model.

2. The method of claim 1, wherein the global ML model is a global automatic speech recognition (ASR) model, and wherein the corresponding on-device ML model is a corresponding on-device ASR model.

3. The method of claim 2, wherein selecting the plurality of client devices to participate in the given round of decentralized learning of the global ML model comprises:

transmitting, to a given client device, a corresponding request for whether the given client device has received the corresponding feedback with respect to the processing of the corresponding client data using the corresponding on-device ASR model, wherein the corresponding feedback with respect to the processing of the corresponding client data using the corresponding on-device ASR model indicates that a corresponding user of the given client device has corrected an ASR misrecognition generated by the on-device ASR model;

receiving, from the given client device, a corresponding response that is responsive to the corresponding request; and in response to determining that the corresponding response that is responsive to the corresponding request indicates that the given client device has received the corresponding feedback with respect to the processing of the corresponding client data using the corresponding on-device ASR model:

selecting the given client device for inclusion in the plurality of client devices to participate in the given round of decentralized learning of the global ML model.

4. The method of claim 3, further comprising:

in response to determining that the corresponding response that is responsive to the corresponding request indicates that the given client device has not received the corresponding feedback with respect to the processing of the corresponding client data using the corresponding on-device ASR model:

refraining from selecting the given client device for inclusion in the plurality of client devices to participate in the given round of decentralized learning of the global ML model.

5. The method of claim 3, further comprising:

continue transmitting, to a plurality of additional client devices, the corresponding request for whether the plurality of additional client devices have received corresponding feedback with respect to the processing of the corresponding client data using the corresponding on-device ASR model until a threshold quantity of client devices have been selected for inclusion in the plurality of client devices to participate in the given round of decentralized learning of the global ML model.

6. The method of claim 2, further comprising:

prior to transmitting the processed version of the global ML model to each of the plurality of client devices:

generating the processed version of the global ML model.

7. The method of claim 6, wherein generating the processed version of the global ML model comprises:

quantizing the global ASR model to generate a quantized version of the global ML model as the processed version of the global ML model.

8. The method of claim 6, wherein generating the processed version of the global ML model comprises:

pruning one or more layers of the global ASR model and/or one or more of the global weights of the global ASR model to generate a pruned version of the global ASR model as the processed version of the global ML model.

9. The method of claim 2, wherein updating the global ML model based on the corresponding updates that are received from the plurality of client devices is based on a weighted client aggregation (WCA) technique.

10. The method of claim 9, wherein the WCA technique includes a frequency based weights technique.

11. The method of claim 10, wherein the frequency based weights technique causes each of the plurality of client devices to generate the corresponding update for the global ML model based on: (i) a corresponding frequency of misrecognized words by the corresponding on-device ASR models across the plurality of client devices.

12. The method of claim 9, wherein the WCA technique includes a frequency and accuracy based weights technique.

13. The method of claim 12, wherein the frequency and accuracy based weights technique causes each of the plurality of client devices to generate the corresponding update for the global ML model based on: (i) a corresponding frequency of misrecognized words by corresponding on-device ASR models across the plurality of client devices, and (ii) a corresponding accuracy of the misrecognized words by the corresponding on-device ASR models across the plurality of client devices.

14. The method of claim 9, wherein the WCA technique includes a frequency, accuracy, and distribution based weights technique.

15. The method of claim 14, wherein the frequency, accuracy, and distribution based weights technique causes each of the plurality of client devices to generate the corresponding update for the global ML model based on: (i) a corresponding frequency of misrecognized words by the corresponding on-device ASR models across the plurality of client devices, (ii) a corresponding accuracy of the misrecognized words by corresponding on-device ASR models across the plurality of client devices, and (iii) a corresponding distribution of corrected words for the misrecognized words by the corresponding on-device ASR models across the plurality of client devices.

16. The method of claim 1, wherein the global ML model is a global large language model (LLM), and wherein the corresponding on-device ML model is a corresponding on-device LLM.

17. The method of claim 16, further comprising:

prior to transmitting the processed version of the global ML model to each of the plurality of client devices:

generating the processed version of the global ML model.

18. The method of claim 17, wherein generating the processed version of the global ML model comprises:

quantizing the global LLM to generate a quantized version of the global LLM as the processed version of the global ML model; or pruning one or more layers of the global LLM and/or one or more of the global weights of the global LLM to generate a pruned version of the global LLM as the processed version of the global ML model.

19. A system comprising:

one or more hardware processors; and memory storing instructions that, when executed by the one or more hardware processors, cause the one or more hardware processors to be operable to:

identify a global machine learning (ML) model that is accessible at a remote system, the global ML model having global weights;

select a plurality of client devices to participate in a given round of decentralized learning of the global ML model, each of the plurality of client devices having previously processed corresponding client data using a corresponding on-device ML model that is an on-device version of the global ML model, and each of the plurality of client devices having received corresponding feedback with respect to the processing of the corresponding client data using the corresponding on-device ML model;

transmit, to each of the plurality of client devices, a processed version of the global ML model, the processed version of the global ML model being of a reduced transferrable size compared to the global ML model, wherein transmitting the processed version of the global ML model to each of the plurality of client devices causes each of the plurality of client devices to:

perform, based on the corresponding client data and the corresponding feedback received with respect to the processing of the corresponding client data using the corresponding on-device ML model, partial model training for the processed version of the global ML model to generate a corresponding update for the global ML model; and transmit, to the remote system, the corresponding update for the global ML model; and update, based on corresponding updates that are received from the plurality of client devices, the global ML model.

20. A non-transitory computer-readable storage medium storing instructions that, when executed by one or more hardware processors, cause the one or more hardware processors to perform operations, the operations comprising:

identifying a global machine learning (ML) model that is accessible at a remote system, the global ML model having global weights;

selecting a plurality of client devices to participate in a given round of decentralized learning of the global ML model, each of the plurality of client devices having previously processed corresponding client data using a corresponding on-device ML model that is an on-device version of the global ML model, and each of the plurality of client devices having received corresponding feedback with respect to the processing of the corresponding client data using the corresponding on-device ML model;

transmitting, to each of the plurality of client devices, a processed version of the global ML model, the processed version of the global ML model being of a reduced transferrable size compared to the global ML model, wherein transmitting the processed version of the global ML model to each of the plurality of client devices causes each of the plurality of client devices to:

perform, based on the corresponding client data and the corresponding feedback received with respect to the processing of the corresponding client data using the corresponding on-device ML model, partial model training for the processed version of the global ML model to generate a corresponding update for the global ML model; and transmit, to the remote system, the corresponding update for the global ML model; and updating, based on corresponding updates that are received from the plurality of client devices, the global ML model.

* * * * *